(12) United States Patent
Xu et al.

(10) Patent No.: US 8,625,406 B2
(45) Date of Patent: Jan. 7, 2014

(54) MULTICAST FAST RE-ROUTE

(75) Inventors: Fengman Xu, Wylie, TX (US); Khalid Elshatali, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 355 days.

(21) Appl. No.: 13/036,063

(22) Filed: Feb. 28, 2011

(65) Prior Publication Data

US 2012/0218883 A1    Aug. 30, 2012

(51) Int. Cl.
*G01R 31/08*   (2006.01)
*H04L 12/28*   (2006.01)
*H04J 3/24*    (2006.01)

(52) U.S. Cl.
USPC ........... 370/217; 370/221; 370/242; 370/390; 370/432; 370/474; 370/475

(58) Field of Classification Search
None
See application file for complete search history.

(56) References Cited

U.S. PATENT DOCUMENTS

| | | | |
|---|---|---|---|
| 6,798,773 B2* | 9/2004 | Trossen et al. | 370/390 |
| 7,656,792 B2* | 2/2010 | Zhang et al. | 370/228 |
| 2005/0076207 A1* | 4/2005 | Park et al. | 713/163 |
| 2006/0015648 A1* | 1/2006 | Lappin et al. | 709/246 |
| 2007/0019646 A1* | 1/2007 | Bryant et al. | 370/390 |
| 2008/0107018 A1* | 5/2008 | Zhang et al. | 370/228 |
| 2009/0262677 A1* | 10/2009 | Banerjea et al. | 370/312 |
| 2011/0038251 A1* | 2/2011 | Li et al. | 370/216 |

\* cited by examiner

*Primary Examiner* — Yemane Mesfin
*Assistant Examiner* — Christine Duong

(57) ABSTRACT

A method including receiving a multicast packet to route to a next multicast hop; determining that the next multicast hop is not available; performing unicast encapsulation to the multicast packet to generate a unicast-encapsulated multicast packet; and sending the unicast-encapsulated multicast packet, as a unicast transmission, via an alternate path relative to a multicast path, to the next multicast hop, wherein the alternate path is a unicast path to the next multicast hop.

18 Claims, 24 Drawing Sheets

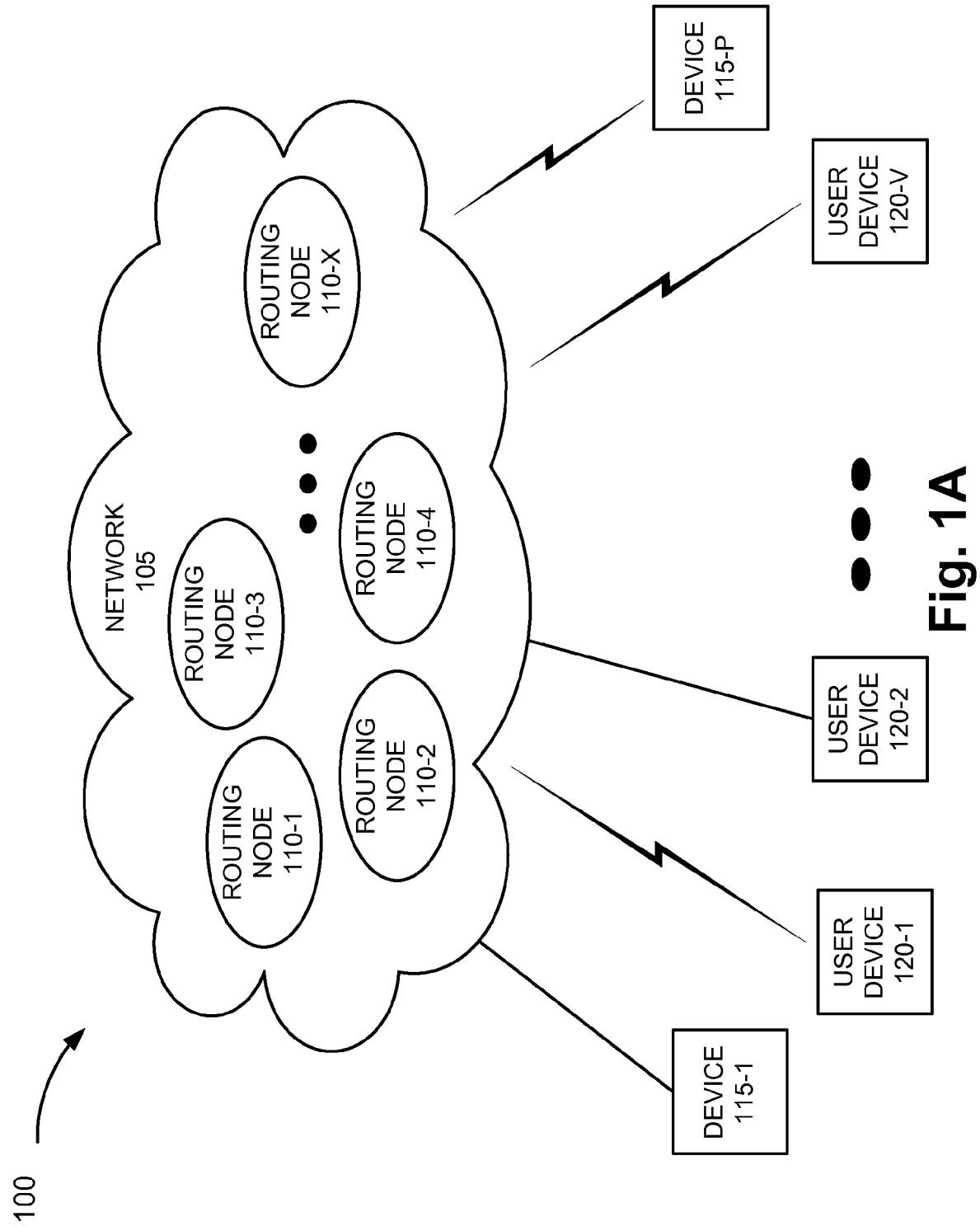

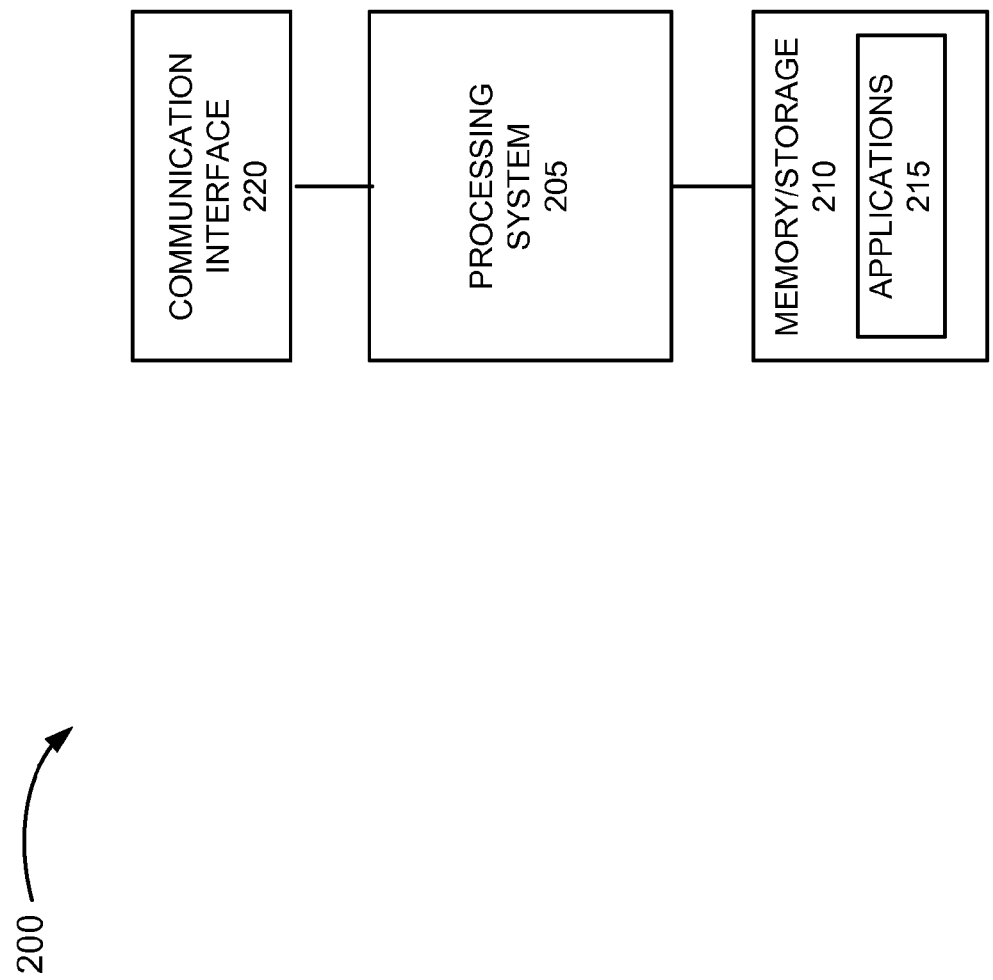

MULTICAST FAST RE-ROUTE

BACKGROUND

As network operators and service providers strive to provide new or improved services and/or assets to users, network demands may correspondingly increase. As a result, network operators and service providers must confront a host of challenges to ensure that quality of service (QOS) and other performance metrics are maintained. For example, one important challenge confronted by network operators and service providers is to ensure that service is not degraded or minimally degraded due to failures in the network.

BRIEF DESCRIPTION OF THE DRAWINGS

FIG. 1A is a diagram illustrating an exemplary environment in which an exemplary embodiment of multicast fast rerouting may be implemented;

FIG. 2 is a diagram illustrating exemplary components of a device that may correspond to one or more devices in the exemplary environment depicted in FIGS. 1A-1E;

DETAILED DESCRIPTION OF PREFERRED EMBODIMENTS

Figure 1B:
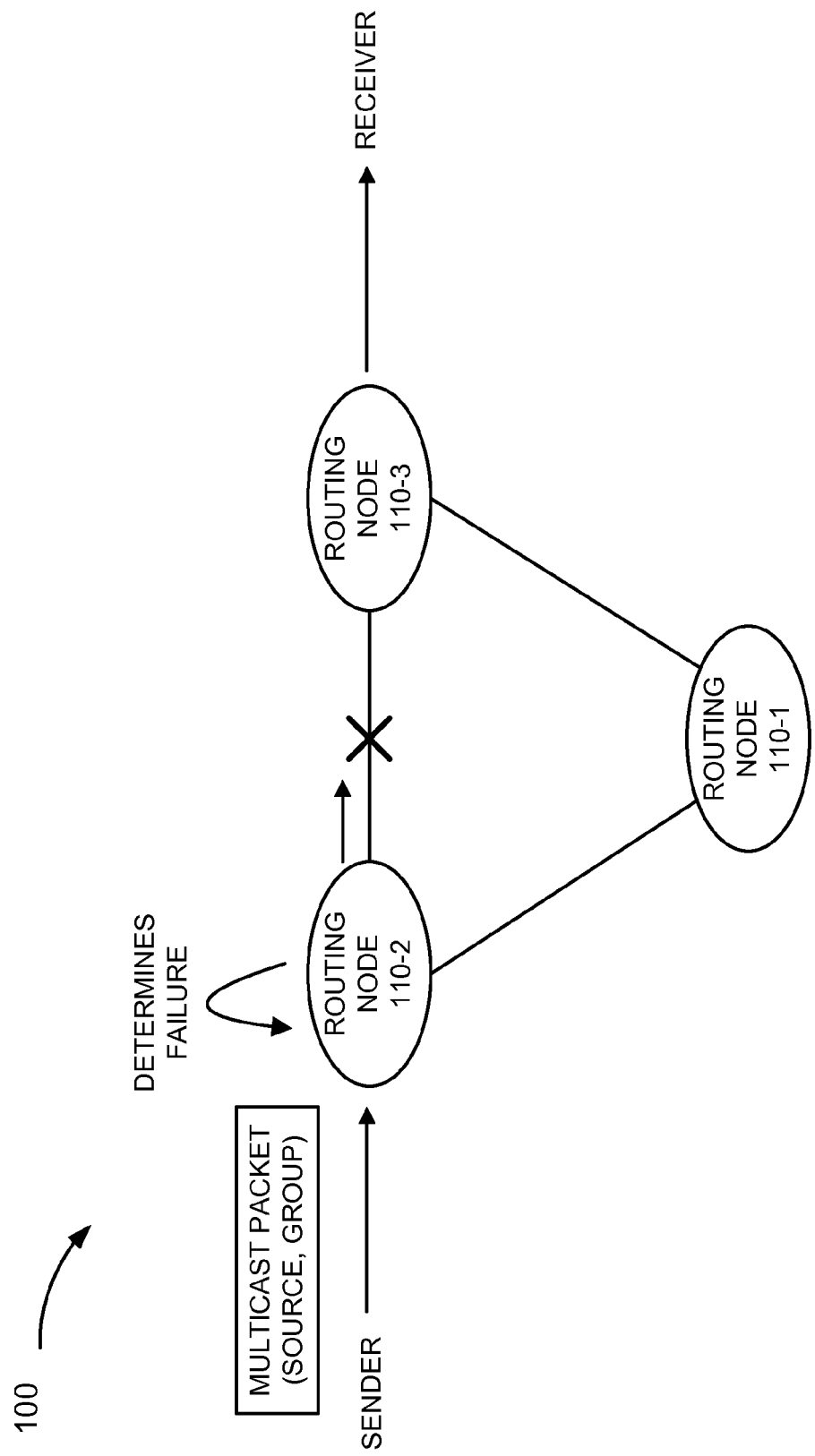
FIGS. 1B-1E are diagrams illustrating exemplary processes for providing multicast fast rerouting.

The following detailed description refers to the accompanying drawings. The same reference numbers in different drawings may identify the same or similar elements. Also, the following detailed description does not limit the invention.

Link and node failures may occur unexpectedly in a network and there are numerous techniques to manage these issues. In a multicast network, a source device may transmit multicast packets to multiple destination devices. Unlike a broadcast transmission, a multicast transmission corresponds to a transmission to a subset of all destination devices. When a failure occurs or exists during a multicast transmission, the aim is to achieve fast restoration while minimizing added network operation complexities, overhead, congestion, etc. Time-sensitive and real-time transmissions (e.g., video, audio, telephony, streaming media, push-to-talk, etc) versus non-real-time or non-time-sensitive transmissions add further complexities to achieve fast restoration. Other issues arise when not all routing nodes have knowledge of the multicast group pertaining to the multicast transmission. Additionally, reverse path forwarding (RPF) checks can result in dropped packets when detecting a wrong ingress interface.

One approach to attain fast restoration involves building backup trees. However, this approach can become very cumbersome as numerous failure scenarios applied to numerous sub-tress can result in numerous backup trees for a multicast group. This is particularly true when the network is not fully-meshed or nearly fully-meshed.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

According to exemplary embodiments, routing nodes may include unicast information with multicast packets when a network failure occurs to permit the multicast packets to be re-routed. According to an exemplary embodiment, a multicast packet may be encapsulated with unicast information. For example, the unicast information may be encapsulated as a unicast header and/or a unicast trailer. According to other embodiments, the unicast information may be included in an options field, a reserved field, an extension field, and/or some other available field(s), depending on the format of the multicast packet.

According to an exemplary embodiment, the unicast information may include a source address of the routing node that includes the unicast information and a destination address of another routing node. According to an exemplary embodiment, the destination address may correspond to a neighbor routing node of the routing node to which the multicast packet was not successfully delivered (e.g., due to node failure and/or link failure). According to another exemplary embodiment, the destination address may correspond to the routing node to which the multicast packet was not successfully delivered.

According to an exemplary embodiment, a routing node that receives the multicast packet including the unicast information may route the multicast packet including the unicast information toward the unicast destination address. When the routing node corresponds to the destination routing node, the routing node may determine whether the routing node is a part of the multicast group. For example, the routing node may inspect a multicast group address included in the multicast packet and recognize whether or not it is part of the multicast group. If the routing node determines that is not part of the multicast group, the routing node may discard or drop the multicast packet. On the other hand, if the routing node determines that it is a part of the multicast group, the routing node may process the multicast packet normally.

According to an exemplary embodiment, the processing of the multicast packet may include the routing node determining whether the multicast packet is a duplicate multicast packet. By way of example, the routing node may determine whether the multicast packet is a duplicate based on, for example, a sequence number included in the multicast packet. Alternatively, the routing node may use other conventional techniques to determine whether a multicast packet is a duplicate based on the format of the multicast packet and information included therein. If the multicast packet is a duplicate, the routing node may discard or drop the multicast packet. If it is determined that the multicast packet is not a duplicate, the routing node may not drop or discard the multicast packet. Rather, the routing node may continue to process the multicast packet, which may include routing the multicast packet to its next multicast hop (e.g., another routing node, a receiver (e.g., an end user device, etc.). According to another exemplary embodiment, the routing node may not be able to determine whether the multicast packet is a duplicate (e.g., no sequence number or other information included in the multicast packet to permit the routing node to make such a determination, etc.) or duplicate multicast packets may be managed by the receiver. According to this embodiment, the routing node may route the multicast packet to its next multicast hop.

According an exemplary embodiment, the routing node may decapsulate the unicast information from the unicast-encapsulated multicast packet or may remove the unicast information from the multicast packet when the routing node recognizes that a unicast destination address included in the unicast information corresponds to its own unicast address. According to another exemplary embodiment, the routing node may decapsulate the unicast information from the unicast-encapsulated multicast packet or may remove the unicast information from the multicast packet when the routing node recognizes that it is a part of the multicast group. According to yet another exemplary embodiment, the routing node may decapsulate the unicast information from the unicast-encapsulated multicast packet or may remove the unicast information from the multicast packet when the routing node recognizes that the multicast packet is not a duplicate.

The term "network," as used herein, is intended to be broadly interpreted to include a network capable of providing both unicast transmission and multicast transmission. For example, the network may correspond to a wireless network or a wired network. Additionally, the network may correspond to an Internet Protocol (IP) network, a Multi-Protocol Label Switching (MPLS) network, an International Standards Protocol (ISO) network, or some other suitable protocol-based network. According to an exemplary embodiment, the network may be a mesh network or substantially mesh network. According to other exemplary embodiments, the network may be another type of topology (e.g., fully connected network, etc.). The term "path," as used herein, is intended to be broadly interpreted to include a physical path and/or a logical path in a network.

The term "routing node," as used herein, is intended to be broadly interpreted to include a network device having routing capability and having multicast and unicast capabilities. For example, the routing node may correspond to a router, a switch, a bridge, a gateway, etc.

FIG. 1A is a diagram illustrating an exemplary environment 100 in which an exemplary embodiment of multicast fast rerouting may be implemented. As illustrated in FIG. 1A, exemplary environment 100 may include a network 105 that includes routing nodes 110-1 through 110-X (referred to as routing nodes 110 or routing node 110), devices 115-1 through 115-P (referred to as devices 115 or device 115), and user devices 120-1 through 120-V (referred to as user devices 120 or user device 120).

The number of devices and configuration in environment 100 is exemplary and provided for simplicity. According to other embodiments, environment 100 may include additional devices, fewer devices, different devices, and/or differently arranged devices than those illustrated in FIG. 1A. Additionally, or alternatively, according to other embodiments, environment 100 may include additional networks than those illustrated in FIG. 1A. Environment 100 may include wired and/or wireless connections among the devices illustrated.

Network 105 may include one or multiple networks of one or multiple types. Network 105 may have unicast and multicast capabilities. Routing node 110 may include a network device having unicast and multicast capabilities and may operate according to one or more of the embodiments described herein. Device 115 may include a device having the capability to communicate with a network (e.g., network 105) and other devices and/or systems. For example, device 115 may correspond to a meter, a sensor, or some other device that is capable of machine-to-machine (M2M) communication.

User device 120 may include a device having the capability to communicate with other devices, systems, networks, and/or or the like. User device 120 may correspond to a portable device, a handheld device, a mobile device, a stationary device, a vehicle-based device, or some other type of user device.

FIGS. 1B-1E are diagrams illustrating an exemplary process for providing multicast fast rerouting. Referring to FIG. 1B, it may be assumed that a sender (e.g., device 115, user device 120 of FIG. 1A) sends a multicast packet to network 105, and the multicast packet is received by routing node 110-2. In this example, the multicast packet may include the source address of the sender and a multicast group address. According to other embodiments, the addressing used for a multicast transmission may be different. Upon receipt of the multicast packet, routing node 110-2 may inspect the multicast packet and determine that the multicast packet should be sent to routing node 110-3. Routing node 110-2 may send the multicast packet to routing node 110-3. For example, routing node 110-2 may not be aware of the link failure between routing node 110-2 and routing 110-3. Subsequent thereto, routing node 110-2 may recognize that the link failure exists.

Figure 1C:
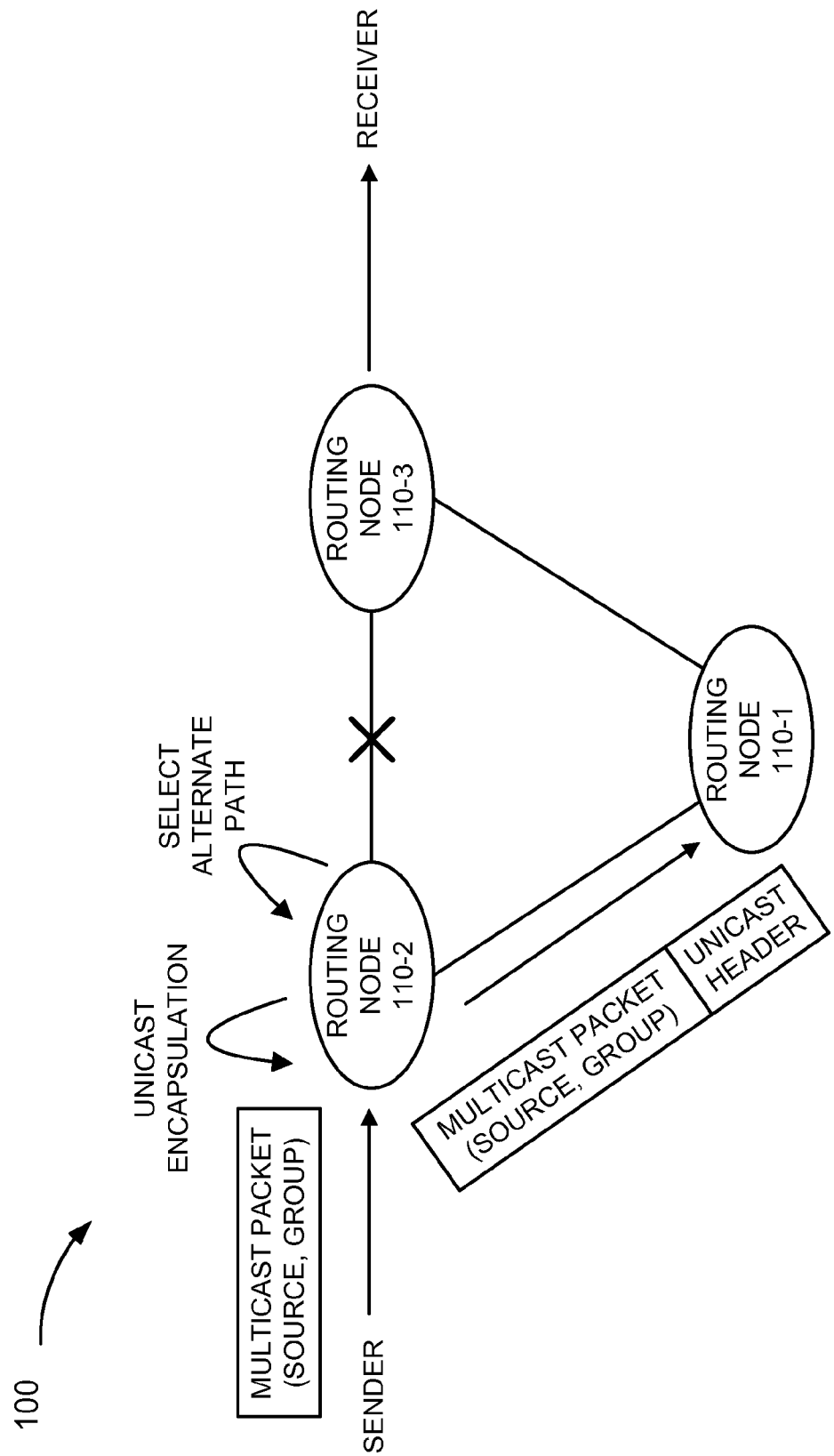
Figure 1D:
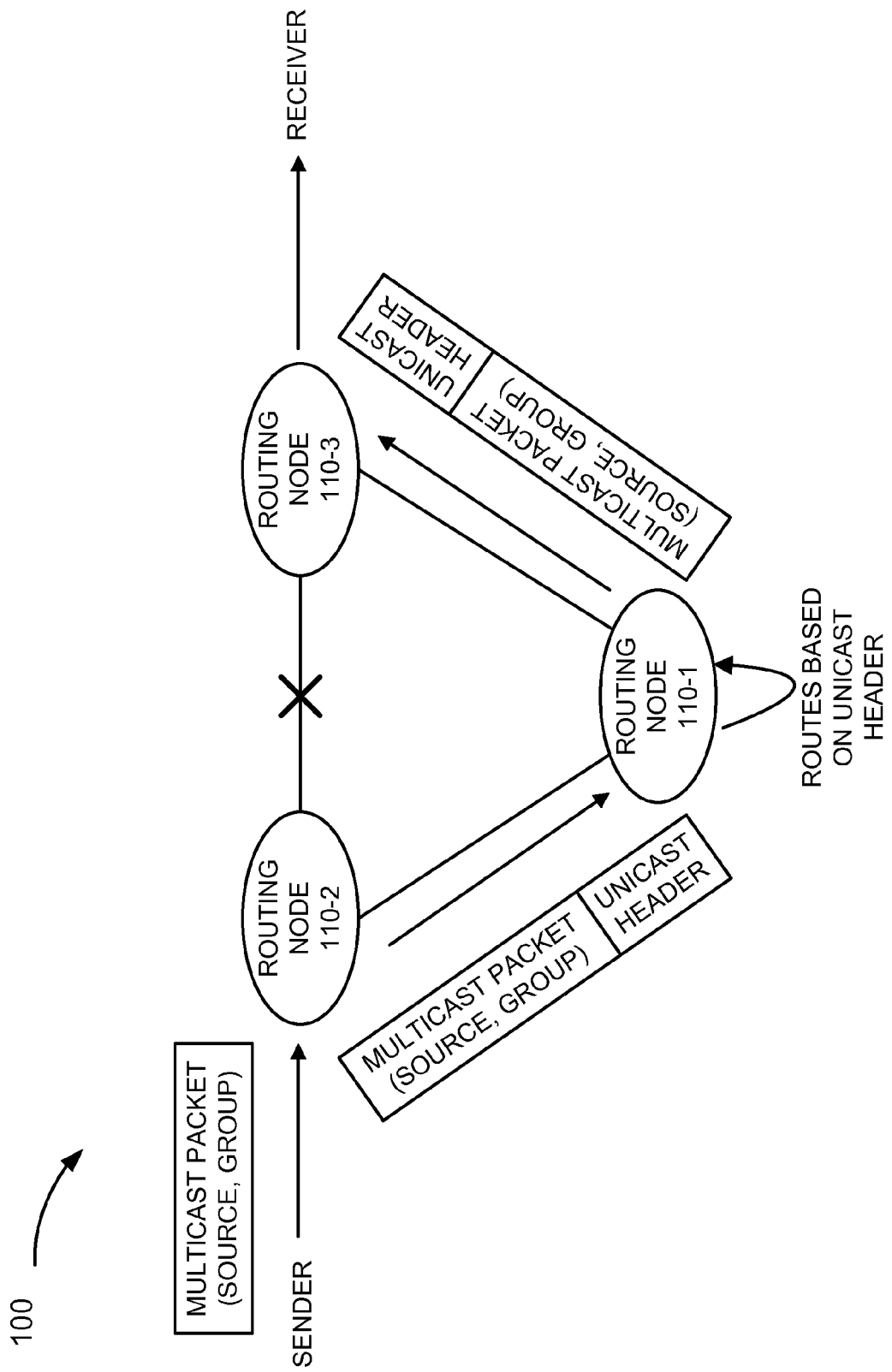

Referring to FIG. 1C, routing node 110-2 may select an alternate path to routing node 110-3. For example, the alternate path may correspond to a unicast path from routing node 110-2 to routing node 110-3 via routing node 110-1. In this example, the unicast path may be considered distinguishable from a multicast path since, in this example, routing node 110-1 may not be a part of the multicast group pertaining to the multicast packet. Routing node 110-2 may encapsulate the multicast packet with a unicast header to generate a unicast-encapsulated multicast packet. The unicast header may include, for example, the source address (e.g., a unicast address) of routing node 110-2 and a destination address (e.g., a unicast address) of routing node 110-3. Routing node 110-2 may send the unicast-encapsulated multicast packet to routing node 110-1 as a unicast transmission. Referring to FIG. 1D, upon receipt of the unicast-encapsulated multicast packet, routing node 110-1 may not drop the multicast packet when it receives the unicast-encapsulated multicast packet. That is, in the case that routing node 110-1 is not part of the multicast group (i.e., the multicast group pertaining to the multicast packet, a back-up multicast group (e.g., a multicast back-up path, etc.) pertaining to the multicast packet, etc.), routing node 110-1 may drop the multicast packet (e.g., a multicast packet that is not encapsulated, a multicast packet that does not include unicast information, etc.). However, since the multicast packet is unicast-encapsulated, routing node 110-1 may not drop the multicast packet. Rather, routing node 110-1 may send the unicast-encapsulated multicast packet to routing node 110-3 based on the unicast header.

Figure 1E:
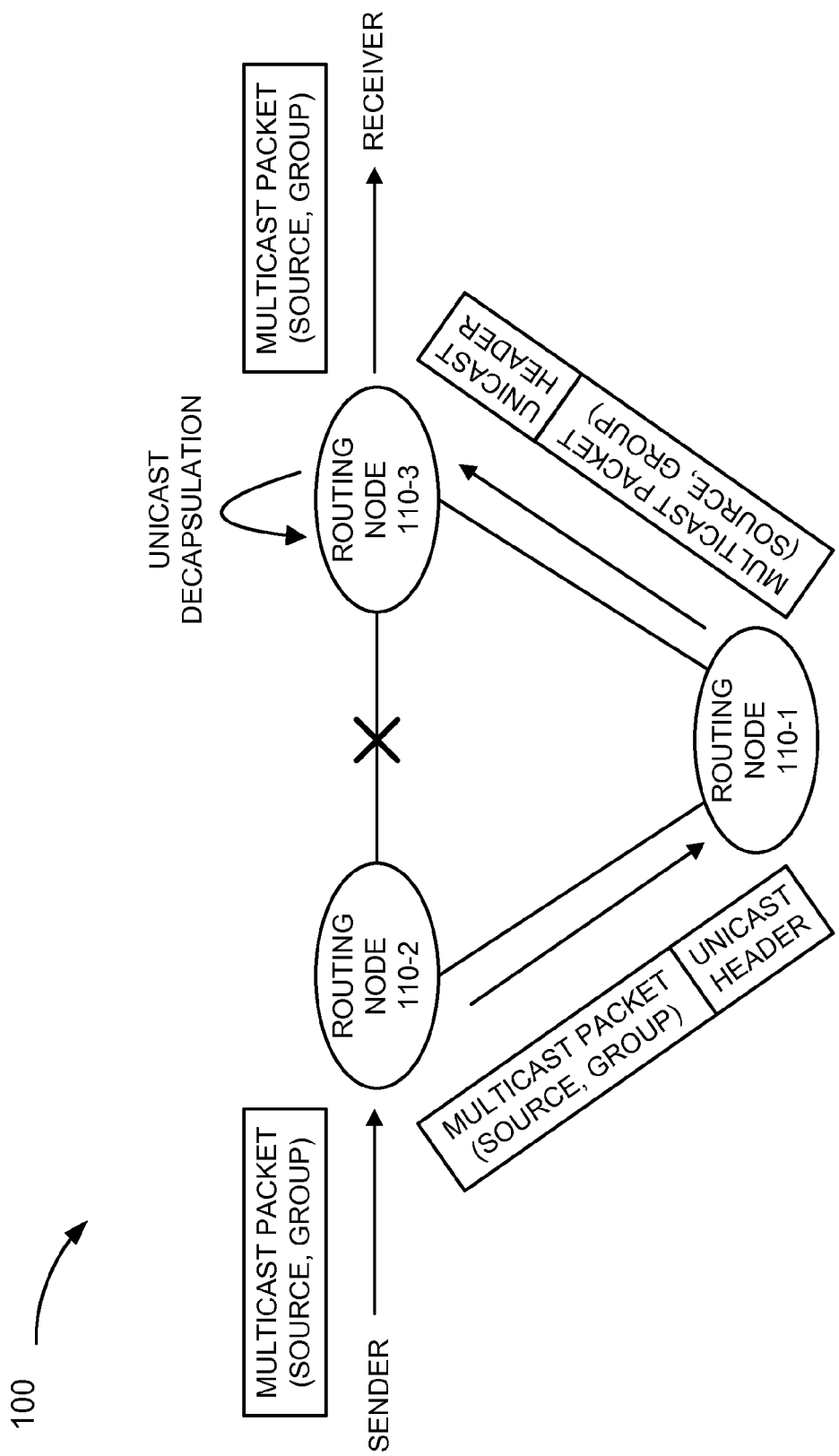

Referring to FIG. 1E, upon receipt of the unicast-encapsulated multicast packet, routing node 110-3 may inspect the unicast-encapsulated multicast packet and identify the destination address (e.g., the unicast destination address included in the unicast header). Routing node 110-3 may also recognize that it belongs to the multicast group pertaining to the multicast packet. Routing node 110-3 may then decapsulate the unicast header from the multicast packet. As further illustrated, routing node 110-3 may process the multicast packet normally. In this example, routing node 110-3 may send the multicast packet to a receiver (e.g., device 115, user device 120). According to other examples, routing node 110-3 may send the multicast packet to another routing node 110 of the multicast group.

FIG. 2 is a diagram illustrating exemplary components of a device 200 that may correspond to one or more of the devices in environment 100. For example, device 200 may correspond to routing node 110, device 115, and/or user device 120 depicted in FIGS. 1A-1E. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein. For example, device 200 may include input components (e.g., a touchscreen, a keyboard, a keypad, a microphone, an input port, etc.) and output components (e.g., a display, a speaker, an output port, etc.).

Processing system 205 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), a Blu-Ray disk (BD), or the like). Memory/storage 210 may include a hard disk (e.g., a magnetic disk, an optical disk, a magneto-optic disk, a solid state disk, etc.) or some other type of medium, along with a corresponding drive. Memory/storage 210 may be external to and/or removable from device 200, such as, for example, a Universal Serial Bus (USB) memory stick, a dongle, a hard disk, mass storage, off-line storage, or the like. Memory/storage 210 may store data, application(s), and/or instructions related to the operation of device 200.

The term "computer-readable medium," as used herein, is intended to be broadly interpreted to include, for example, a memory, a secondary storage, a CD, a DVD, a BD, or another type of tangible storage medium.

Applications 215 may include software that provides various services or functions. For example, with reference to routing node 110, applications 215 may include one or multiple applications pertaining to routing packets (e.g., creating and managing routing tables, forwarding tables, trees, etc., managing network topology and/or link state information, protocols, packet processing, etc.). According to an exemplary embodiment, applications 215 may include one or multiple applications pertaining to multicast fast rerouting, as described herein. With reference to device 115, applications 215 may include one or multiple applications for sending and receiving packets. With reference to user device 120, applications 215 may include a telephone application, a voice recognition application, a video application, a multi-media application, a music player application, a web browsing application, a location-based application (e.g., a Global Positioning System (GPS)-based application, etc.), and/or other types of applications (e.g., business applications, etc.).

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), transceiver(s), and/or line interface(s). Communication interface 220 may include other types of communicative components, such as, for example, modulators, demodulators, multiplexers, de-multiplexers, filters, amplifiers, equalizers, and/or forward error correctors. With reference to routing node 110, communication interface 220 may be capable of multicast and unicast transmissions.

Device 200 may perform operations in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

As previously described, routing node 110 may provide multicast fast rerouting. Provided below are further examples and discussion pertaining to exemplary embodiments of the multicast fast rerouting.

Figure 3A:
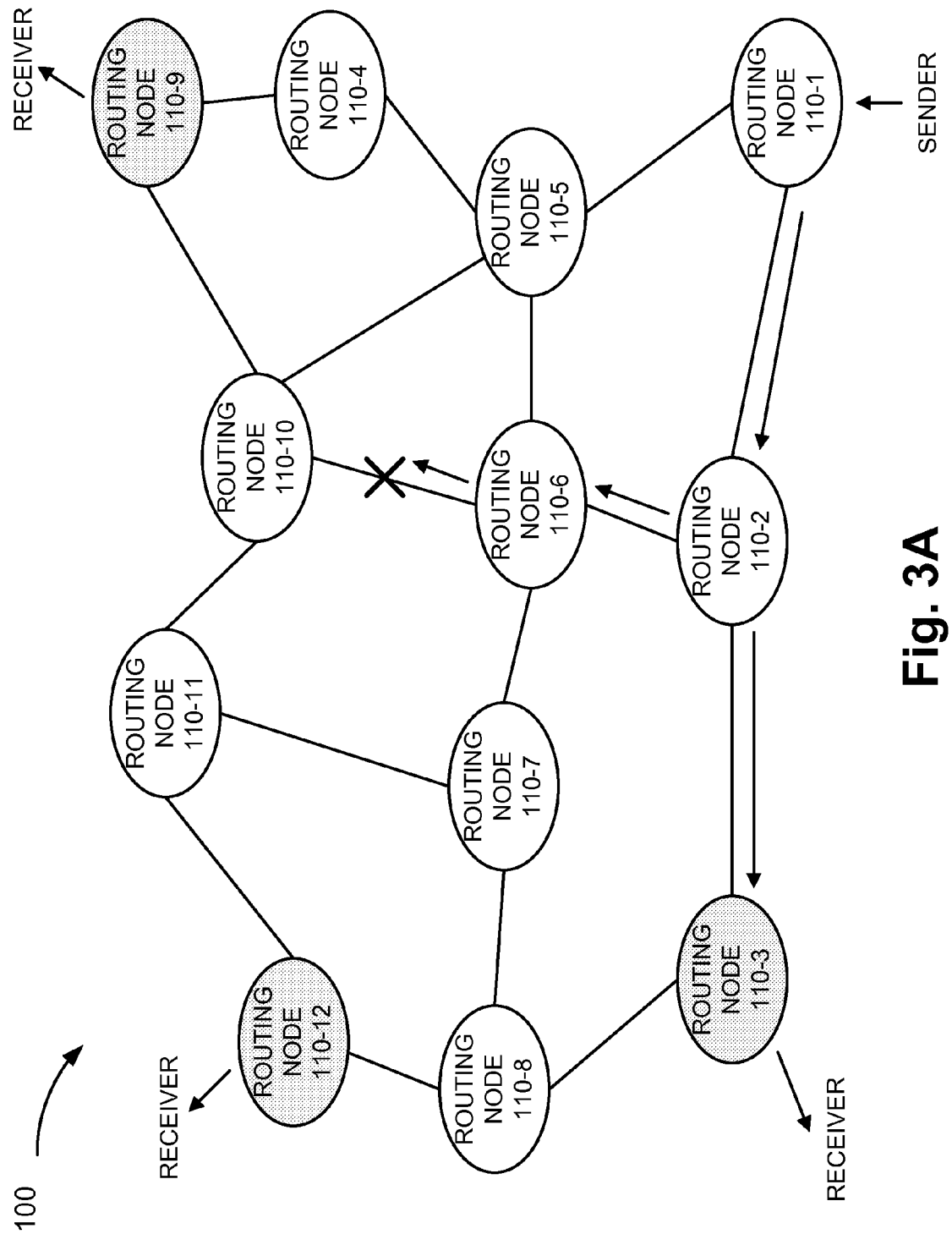
FIGS. 3A and 3B are diagrams illustrating an exemplary process for providing multicast fast rerouting when a link failure occurs.
Figure 3B:
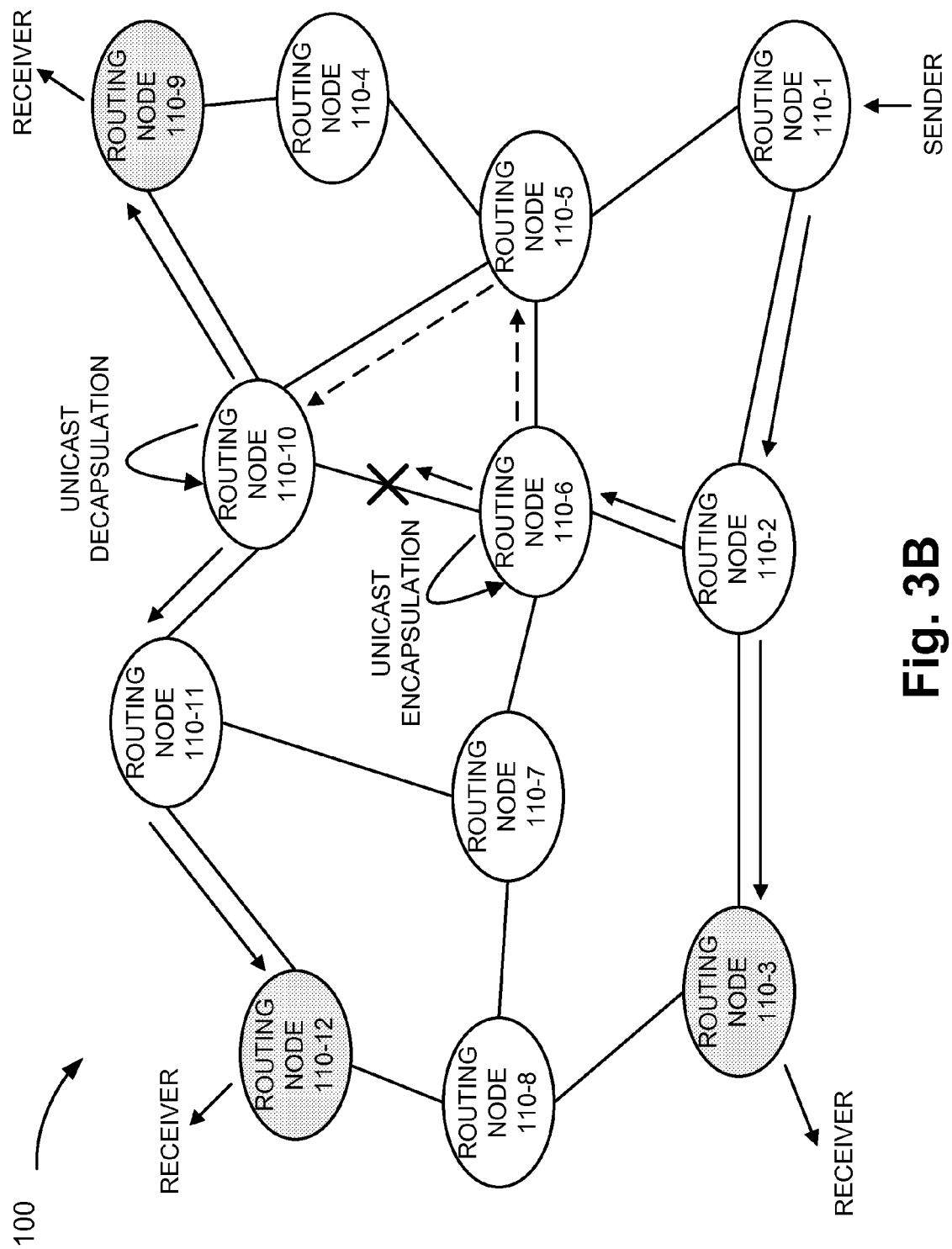

FIGS. 3A and 3B are diagrams illustrating an exemplary process for providing multicast fast rerouting when a link failure occurs. Referring to FIG. 3A, according to this exemplary scenario, a sender may send multicast packets to routing node 110-1, which propagate to routing nodes 110-2, 110-3, and 110-6. Upon receipt by routing node 110-6, routing node 110-6 may send the multicast packets to routing node 110-10, however, due to a link failure, the multicast packets are not received by routing node 110-10.

Depending on the protocols, network topology management, and/or link state management used by network 105 (e.g., by routing nodes 110, etc.), as well as other factors (e.g., time of failure relative to time of receipt of multicast packets), routing node 110-6 may or may not determine or have knowledge that the link between routing node 110-6 and routing node 110-10 has failed. According to an exemplary embodiment, routing node 110-6 may determine or has knowledge that the link has failed. For example, routing node 110-6 may use a link state protocol (e.g., Bidirectional Forwarding Detection (BFD), Operations, Administration, and Maintenance (OAM), Open Shortest Path First (OSPF), etc.) and/or other conventional techniques. According to another embodiment, routing node 110-6 may not determine or has knowledge that the link has failed, but may recognize that the multicast packets have not been successfully forwarded and/or received by routing node 110-10. For example, routing node 110-6 may not receive an acknowledgement from routing node 110-10 and/or other conventional techniques may be used. In this example, it may be assumed that routing node 110-6 may determine that a link failure exists between routing node 110-6 and routing node 110-10.

Referring to FIG. 3B, based on the determination of link failure, routing node 110-6 may determine to send the multicast packets as a unicast transmission. For example, routing node 110-6 may select a path (e.g., a unicast path) to reach routing node 110-10. According to this example, routing node 110-6 may choose to send unicast-encapsulated multicast packets to routing node 110-10 via routing node 110-5. Additionally, as illustrated, routing node 110-6 may perform unicast encapsulation with respect to the multicast packets. The unicast encapsulation may include unicast information that at least includes a destination address of routing node 110-10. The unicast information may also include a network address of routing node 110-6 (e.g., as the source address). Routing node 110-6 may send the unicast-encapsulated multicast packets to routing node 110-10 via routing node 110-5, as illustrated in FIG. 3B (i.e., by the dotted arrows).

Upon receipt of the unicast-encapsulated multicast packets, routing node 110-10 may inspect the destination address included in the unicast information. Recognizing its own address, routing node 110-10 may inspect the multicast packet and recognize that it is part of the multicast group. Routing node 110-10 may perform unicast decapsulation with respect to the received unicast-encapsulated multicast packets. Thereafter, as illustrated in FIG. 3B (i.e., by solid arrows), routing node 110-10 may send the multicast packets to routing nodes 110-9 and 110-11. Routing node 110-11 may route the multicast packets to routing node 110-12. According to other embodiments, as previously described, encapsulation and decapsulation may not be used. For example, routing node 110-6 may insert unicast information to an available field(s) of the multicast packets, and routing node 110-10 may remove the unicast information from these fields.

According to the above example, multicast packets are rerouted to routing node 110-10 via routing node 110-5 when a link failure occurs. However, such an approach would not be practical in the event that the failure is a node failure (e.g., routing node 110-10 failed). Described below is an exemplary process for providing multicast fast rerouting when there may be a node failure.

Figure 4A:
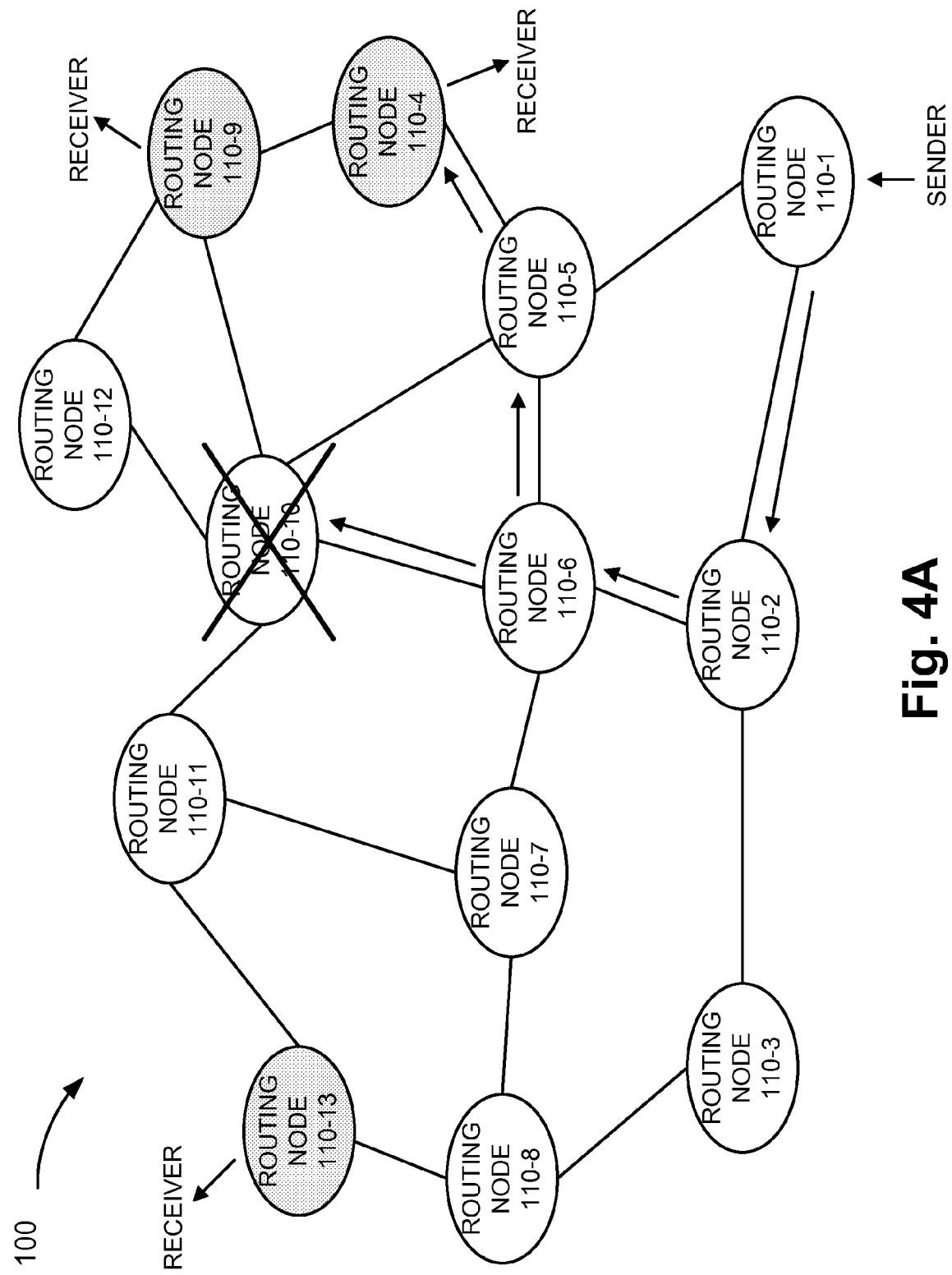
FIGS. 4A-4D are diagrams illustrating another exemplary process for providing multicast fast rerouting when a node failure occurs.

FIGS. 4A-4D are diagrams illustrating another exemplary process for providing multicast fast rerouting when a node failure occurs. Referring to FIG. 4A, according to this exemplary scenario, a sender may send multicast packets to routing node 110-1, which may be routed to routing node 110-6 via routing node 110-2. Upon receipt, routing node 110-6 may send the multicast packets to routing nodes 110-10 and 110-5. The multicast packets may be routed from routing node 110-5 to routing node 110-4. However, due to node failure of routing node 110-10, the multicast packets are not received by routing node 110-10.

Similar to that described above, depending on the protocols, network topology management, and/or link state management used by network 105 (e.g., by routing nodes 110, etc.), as well as other factors (e.g., time of failure relative to time of receipt of multicast packets), routing node 110-6 may or may not determine that a node failure has occurred with respect to routing node 110-10 or have knowledge of the node failure. For example, routing node 110-6 may determine that routing node 110-10 has failed based on re-connectivity messages (e.g., pertaining to a reboot, etc.) received from routing node 110-10, network state information received from neighbor routing node(s) 110, and/or other conventional techniques. According to another embodiment, routing node 110-6 may not determine that routing node 110-10 has failed, but recognizes that the multicast packets have not been successfully sent and/or received by routing node 110-10. In this example, it may be assumed that routing node 110-6 may determine or has knowledge that routing node 110-10 has failed. In this example, it may be assumed that when operational, routing node 110-10 may send multicast packets to routing nodes 110-11 and 110-9.

Figure 4B:
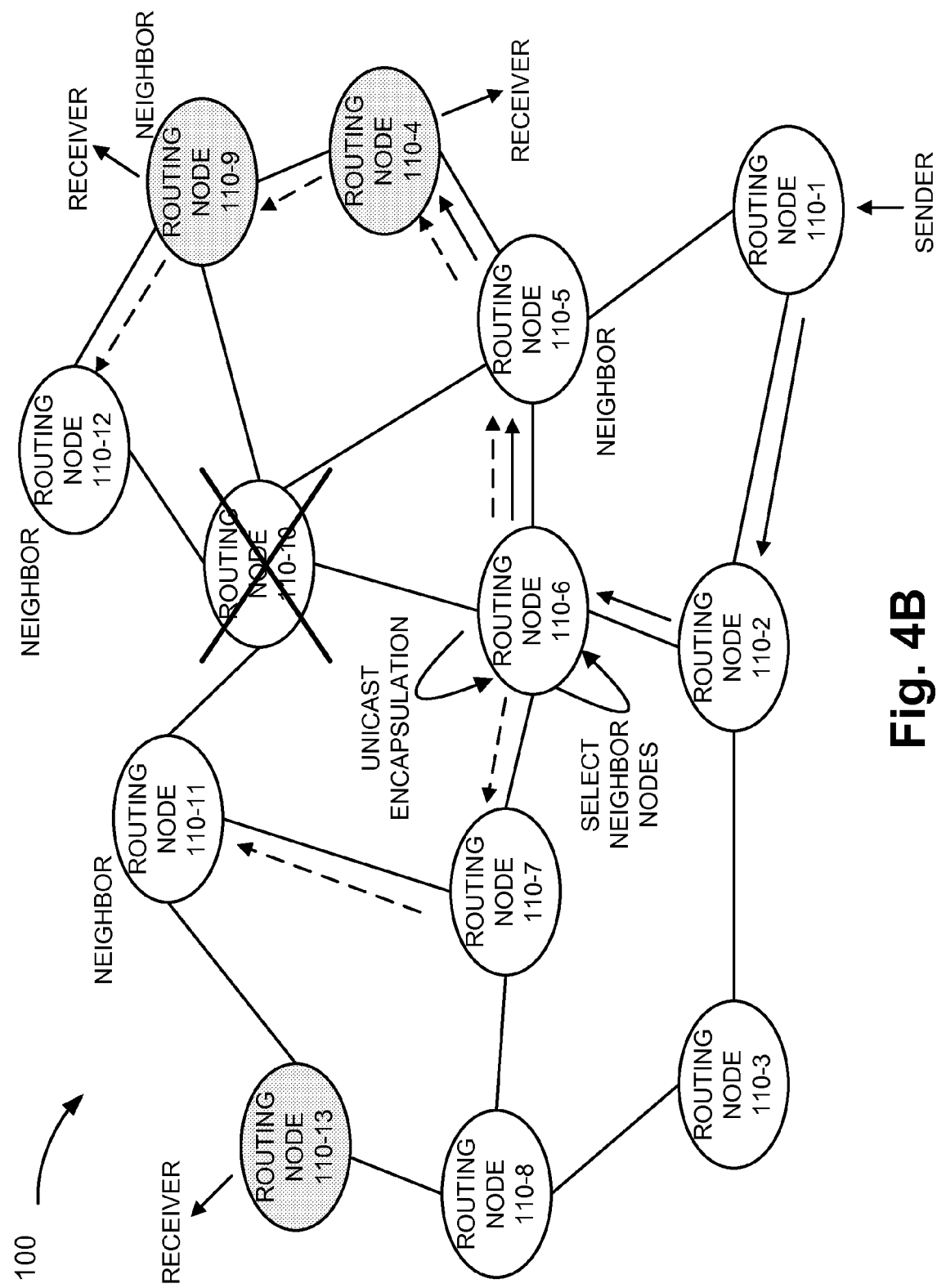

Referring to FIG. 4B, based on the determining of node failure or knowledge, routing node 110-6 may determine to send the multicast packets as a unicast transmission. According to an exemplary embodiment, routing node 110-6 may select paths to all neighboring (or adjacent) routing node(s) of routing node 110-10 (i.e., excluding itself—routing node 110-6). According to another exemplary embodiment, routing node 110-6 may select paths to less than all of neighboring (or adjacent) routing node(s) of routing node 110-10. Routing node 110-6 may use, for example, network topology and/or link state information pertaining to unicast transmissions to select the neighbors of routing node 110-10. In this example, routing node 110-06 may select routing nodes 110-5, 110-9, 110-11, and 110-12 as neighbor or adjacent routing nodes of routing node 110-10.

As further illustrated, routing node 110-6 may perform unicast encapsulation with respect to the multicast packets to generate unicast-encapsulated multicast packets. The unicast-encapsulation may include unicast information that at least includes the destination addresses of the neighboring routing nodes 110 (i.e., routing nodes 110-5, 110-9, 110-11, and 110-12). The unicast information may also include a unicast source address of routing node 110-6. Routing node 110-6 may separately send the unicast-encapsulated multicast packets to routing nodes 110-5, 110-9, 110-11, and 110-12, as illustrated in FIG. 4B.

Figure 4C:
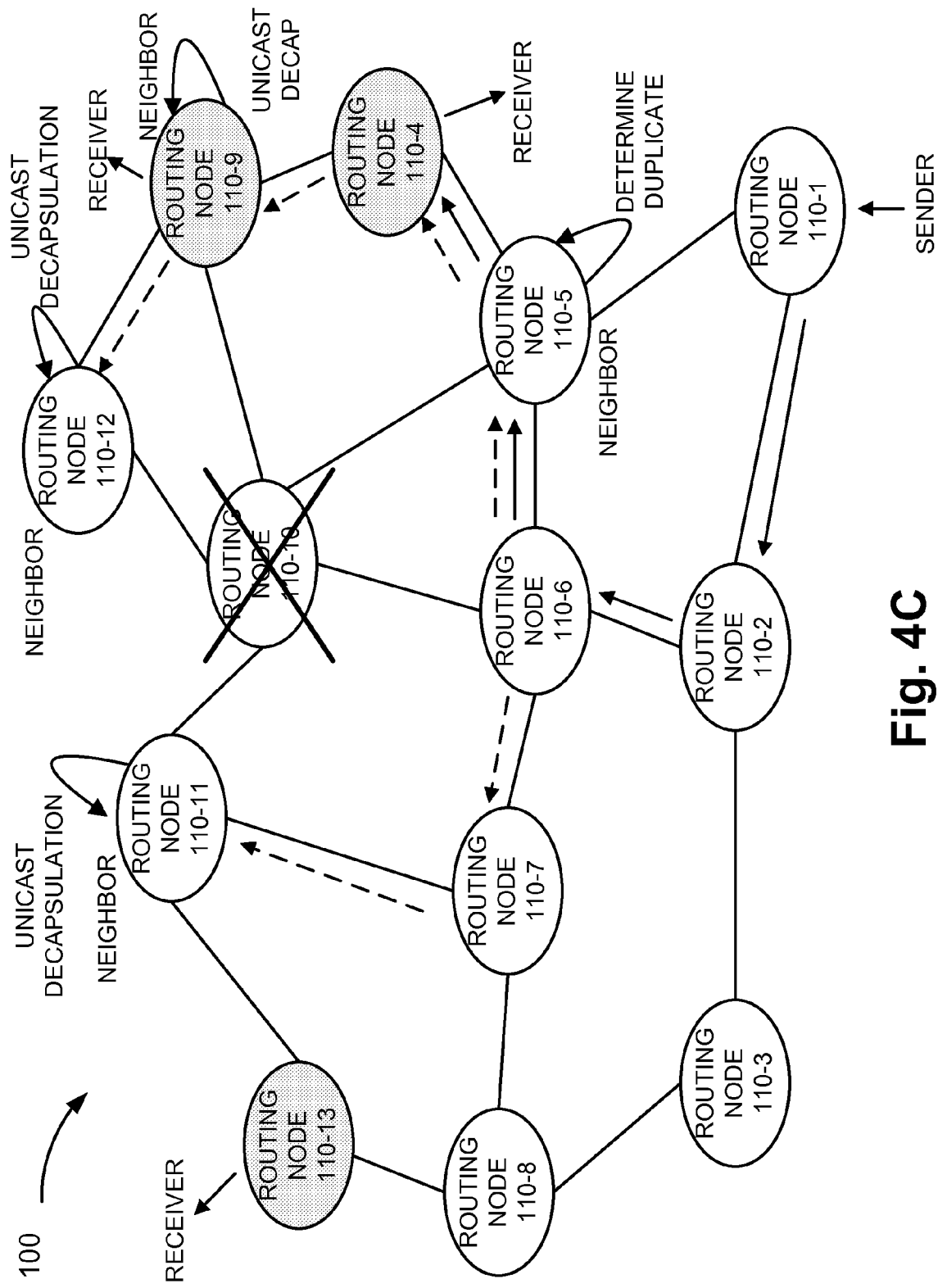

Referring to FIG. 4C, upon receipt of the unicast-encapsulated multicast packets, routing nodes 110-5, 110-9, 110-11, and 110-12 may inspect the destination addresses included in the unicast-encapsulated multicast packets (i.e., the unicast information (e.g., the unicast destination address)). Recognizing their own addresses, routing nodes 110-5, 110-9, 110-11, and 110-12 may decapsulate the unicast-encapsulated multicast packets (e.g., decapsulate a unicast header and/or trailer). Routing nodes 110-5, 110-9, 110-11, and 110-12 may inspect the multicast packets and determine whether they are part of the multicast group. For example, routing nodes 110-5, 110-9, 110-11, and 110-12 may inspect the multicast group address. In this example, it may be assumed that routing nodes 110-9, 110-11, and 110-12 are part of the multicast group. Routing node 110-5 is part of the multicast group, as previously illustrated in FIG. 4A. As further illustrated in FIG. 4C, routing node 110-5 may determine, however, that the multicast packets are duplicates (e.g., based on the multicast packets sent to routing node 110-4, as illustrated in FIG. 4A), and routing nodes 110-9, 110-11, and 110-12 may determine that the multicast packets are not duplicates. According to another exemplary embodiment, routing node 110-6 may not send the unicast-encapsulated multicast packets to routing 110-5, despite the fact that routing node 110-5 is a neighboring routing node 110 of routing node 110-10, because routing node 110-6 has knowledge that the multicast packets previously sent (as illustrated in FIG. 4A), where successfully transmitted and/or received by routing node 110-5. In this way, additional overhead in network 105 may be avoided. Routing nodes 110-9, 110-11, and 110-12 may perform unicast decapsulation with respect to the received unicast-encapsulated multicast packets.

Figure 4D:
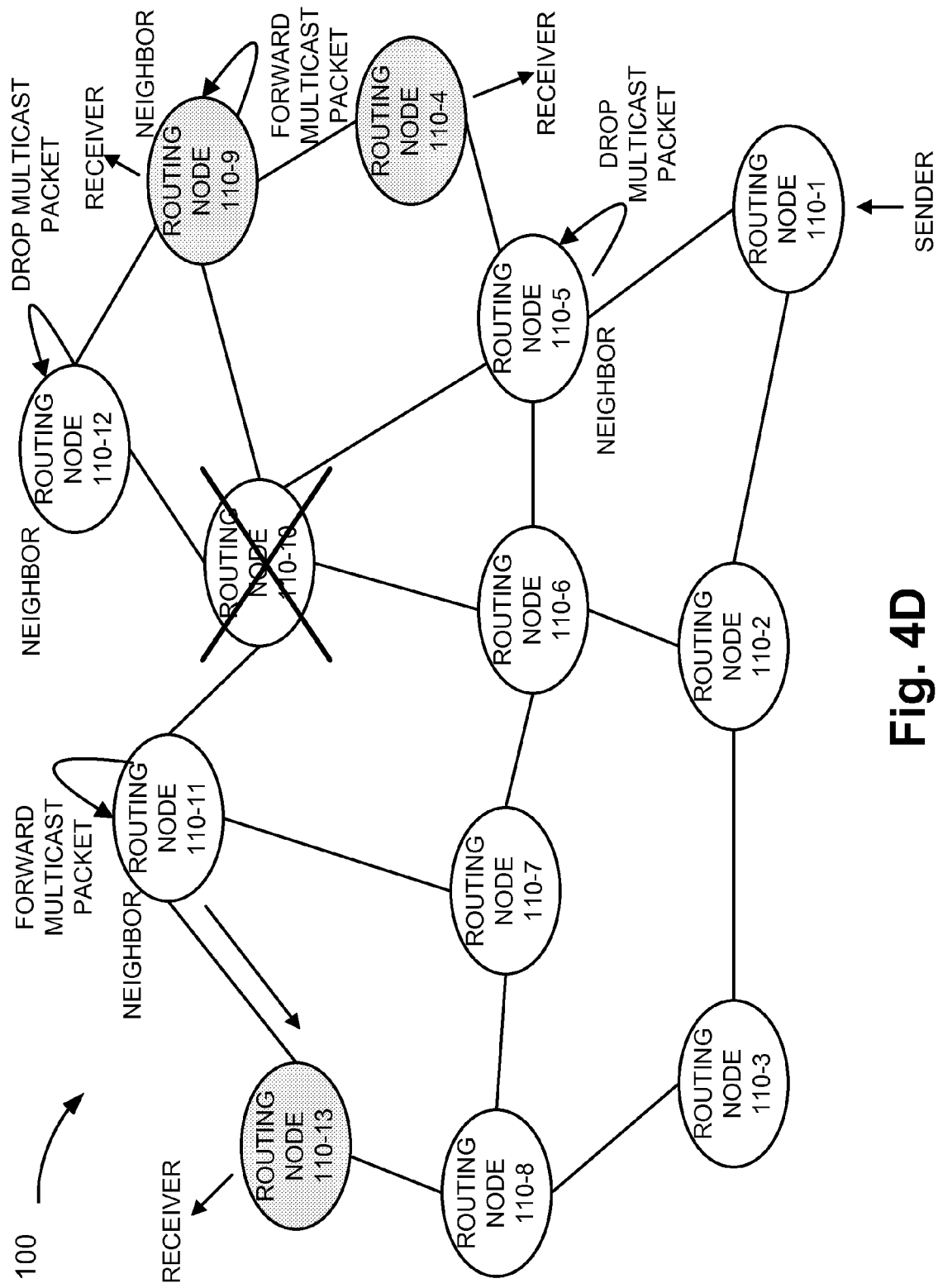

Referring to FIG. 4D, routing node 110-5 may drop the unicast-encapsulated multicast packets. Routing nodes 110-9 and 110-11 may forward the multicast packets to their next multicast hop (e.g., towards a receiver, another routing node 110, etc.). In this example, routing node 110-12 may recognize that it is not part of the multicast group, and may drop the multicast packets. According to other embodiments, as previously described, encapsulation and decapsulation may not be used. For example, routing node 110-6 may insert unicast information to an available field(s) of the multicast packets, and the neighboring routing nodes 110-9, 110-11, and 110-12 may remove the unicast information from these fields.

According to an exemplary embodiment, when duplicate multicast packets are received, routing nodes 110 may give preference to multicast packets over unicast-encapsulated multicast packets when it comes to determining duplicates and dropping duplicates. That is, routing nodes 110 may drop unicast-encapsulated multicast packets instead of multicast packets. According to other exemplary embodiments, routing nodes 110 may not give preference to multicast packets. Rather, routing nodes 110 may simply drop the later-arriving multicast packet (i.e., the multicast packet or the unicast-encapsulated multicast packet). According to other embodiments, routing nodes 110 may not be able to determine whether multicast packets are duplicates (e.g., not enough information in the header to determine whether the multicast packet is a duplicate, etc.). Under such circumstances, routing nodes 110 may route multicast packets that may be duplicates. However, the receiver may be able to manage the duplicate problem, if it should exist.

Figure 5A:
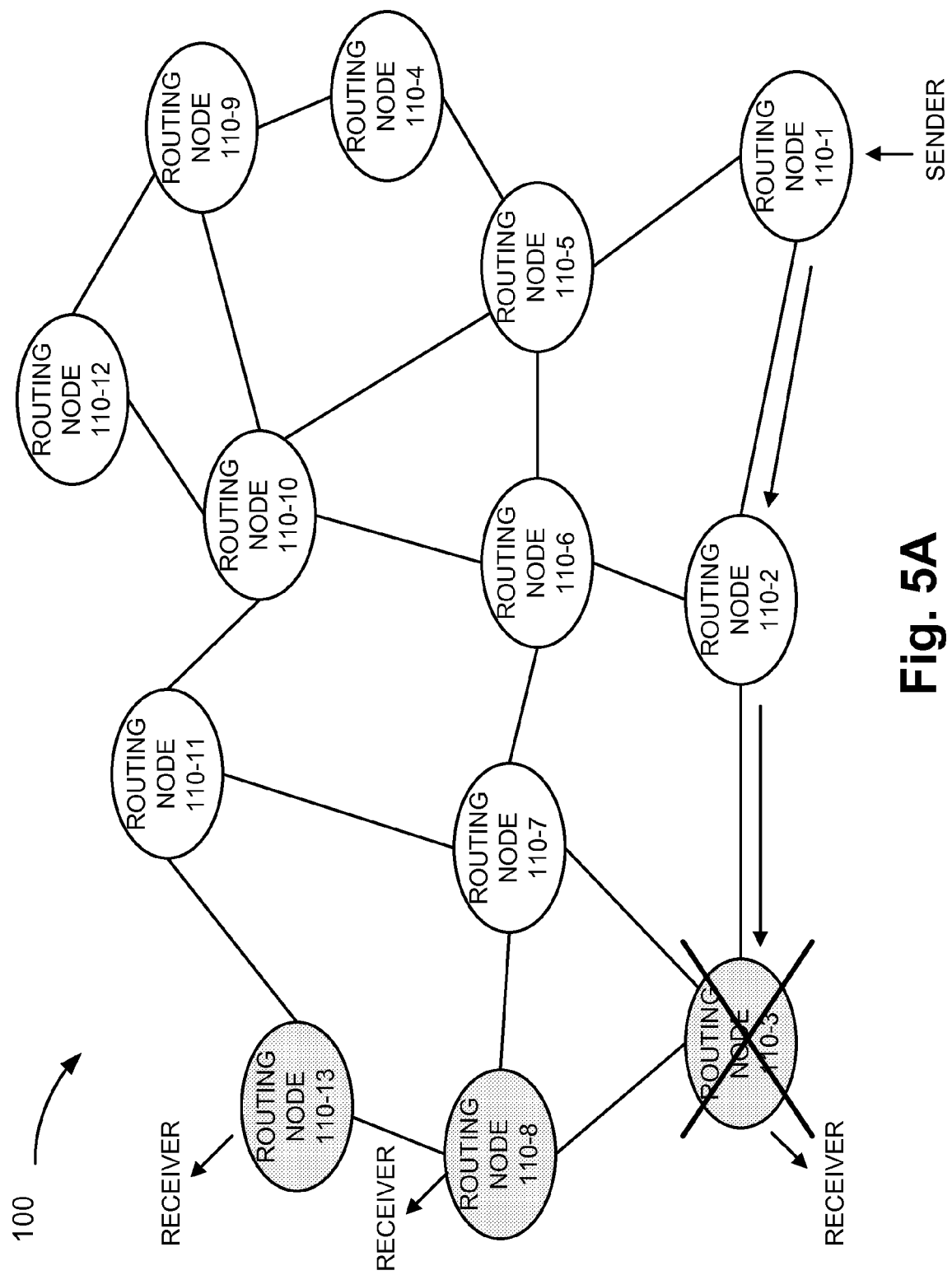
FIGS. 5A-5D are diagrams illustrating another exemplary process for providing multicast fast rerouting when a node failure occurs.

FIGS. 5A-5D are diagrams illustrating another exemplary process for providing multicast fast rerouting when a node failure occurs. Referring to FIG. 5A, according to an exemplary scenario, a sender may send multicast packets to routing node 110-1, which may be routed to routing node 110-2. Upon receipt of the multicast packets, routing node 110-2 may send the multicast packets to routing node 110-3. However, due to node failure of routing node 110-3, the multicast packets are not received by routing node 110-3. In this example, routing node 110-3 is the last-hop, multicast routing node before the receiver. Additionally, routing node 110-3 may be the routing node to forward multicast packets to both routing nodes 110-7 and 110-8.

Figure 5B:
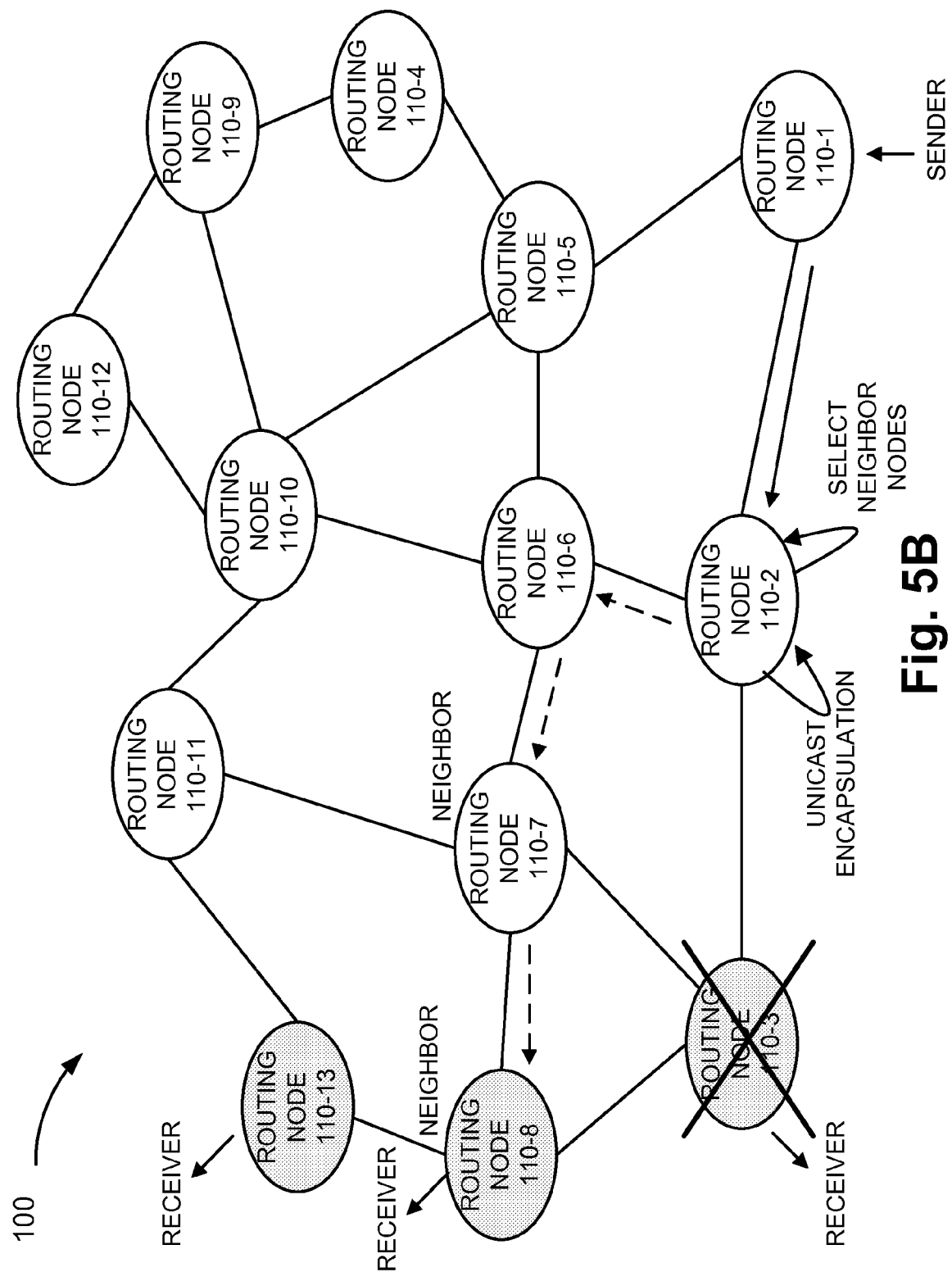

Referring to FIG. 5B, based on the determining of node failure (or failed transmission/receipt of multicast packets), and according to this example, routing node 110-2 may select all neighboring routing nodes (i.e., excluding routing node 110-2) of routing node 110-3. For example, routing node 110-2 may select routing nodes 110-7 and 110-8. As further illustrated, routing node 110-2 may perform unicast encapsulation to the multicast packets. Routing nodes 110-2 may send the unicast-encapsulated multicast packets to routing nodes 110-7 and 110-8, respectively.

Figure 5C:
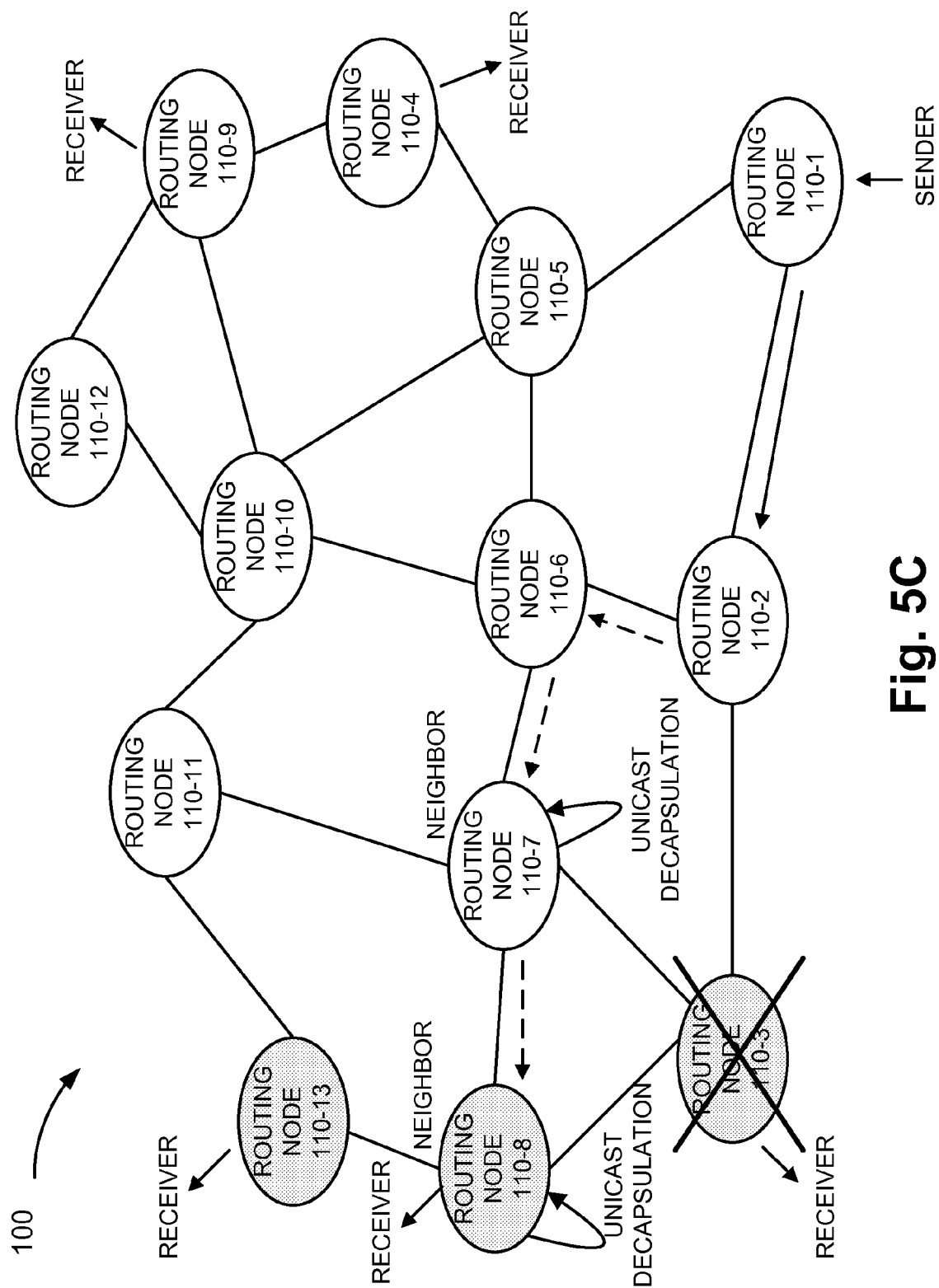

Referring to FIG. 5C, upon receipt of the unicast-encapsulated multicast packets, routing nodes 110-7 and 110-8 may inspect the unicast-encapsulated multicast packets, determine whether the unicast destination address corresponds to them, determine whether they are a part of the multicast group, and determine whether the multicast packets are duplicates. Routing nodes 110-7 and 110-8 may perform unicast decapsulation with respect to the received unicast-encapsulated multicast packets.

Figure 5D:
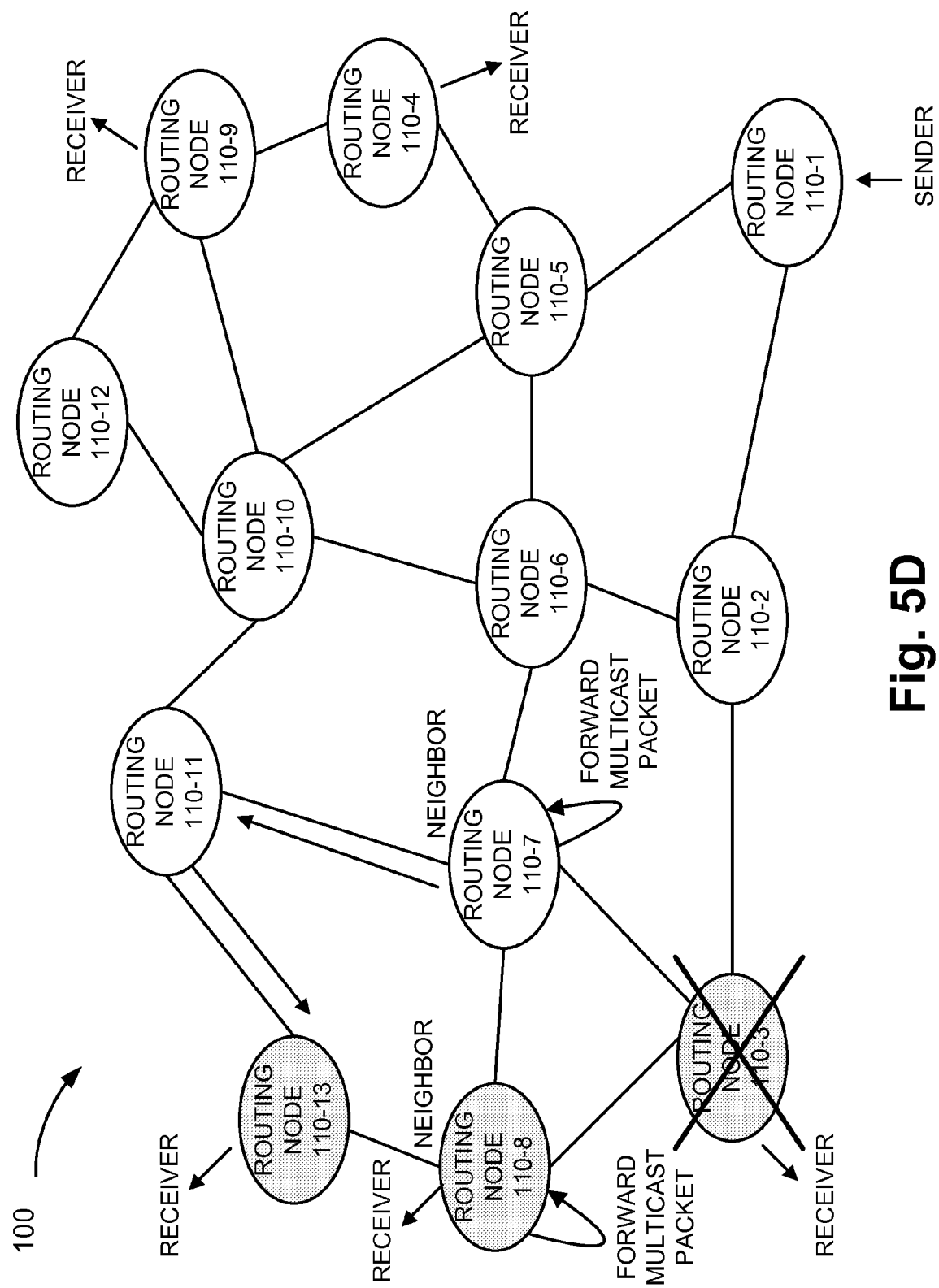

Referring to FIG. 5D, routing node 110-7 may send the multicast packets to routing node 110-11, which in turn, may send the multicast packets to routing node 110-13. Additionally, routing node 110-8 may send the multicast packets to a receiver.

While the above examples have addressed multicast fast rerouting pertaining to a link failure or a node failure, in some cases, both types of failures may occur. According to an exemplary embodiment, routing node 110 may use both approaches, in combination, to provide multicast fast rerouting. According to other embodiments, routing node 110 may use only one of the approaches to provide multicast fast rerouting. By way of example, referring to FIG. 6A, if routing node 110-6 knows that routing node 110-10 has failed, it would be impractical to use the multicast fast rerouting approach previously described with respect to FIGS. 3A and 3B.

Figure 6A:
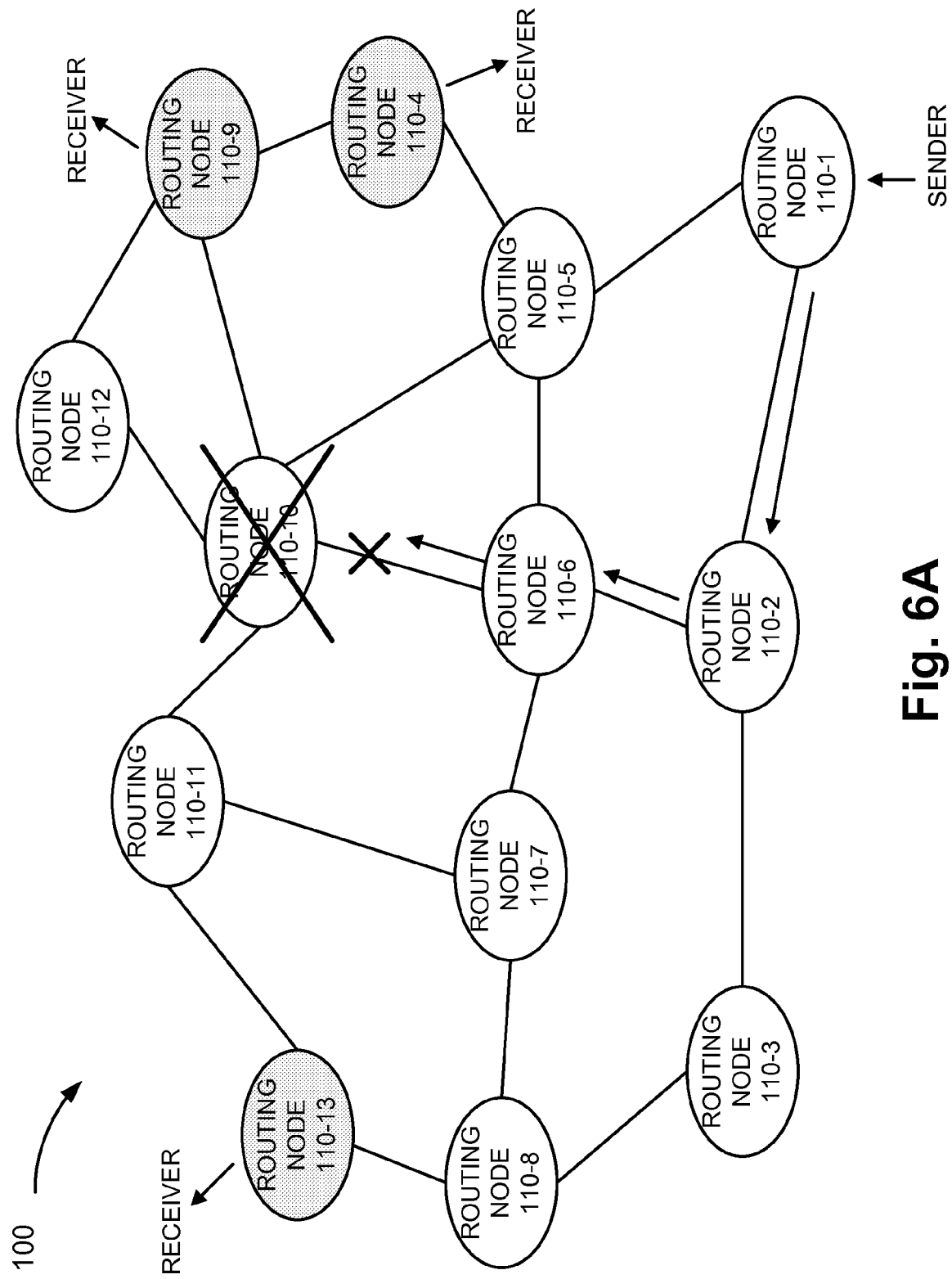
FIGS. 6A-6D are diagrams illustrating another exemplary process for providing multicast fast rerouting.
Figure 6B:
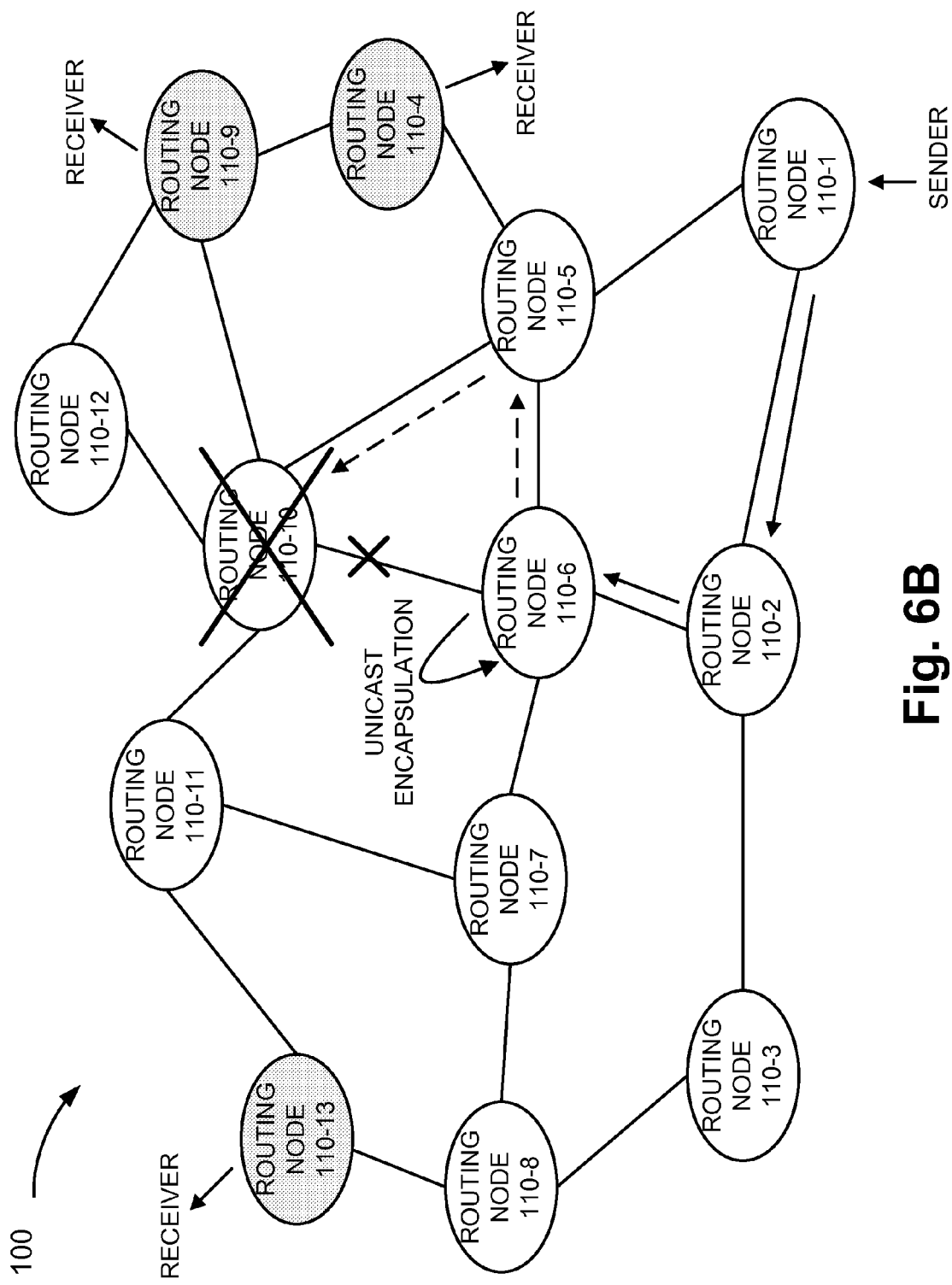
Figure 6C:
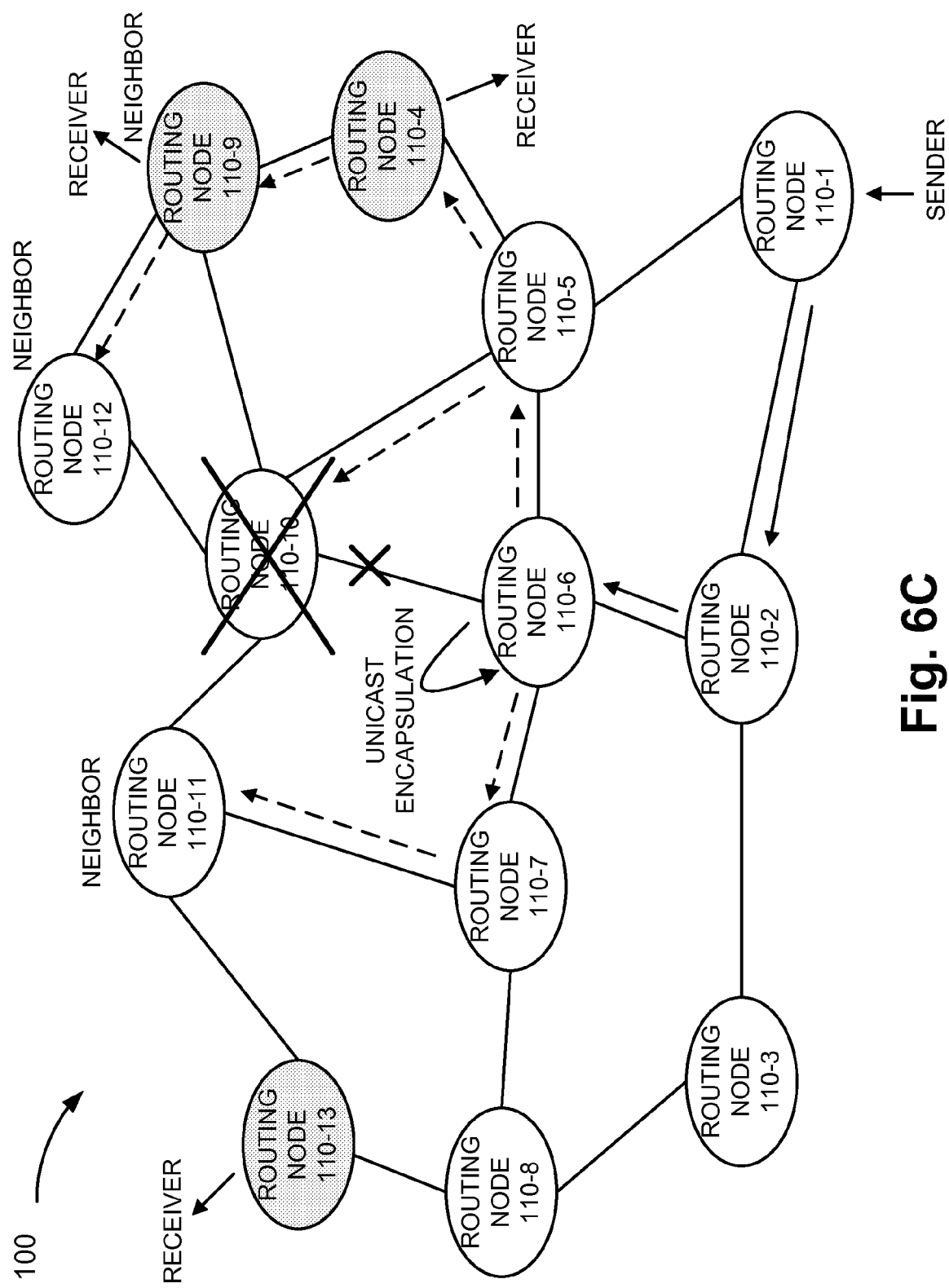
Figure 6D:
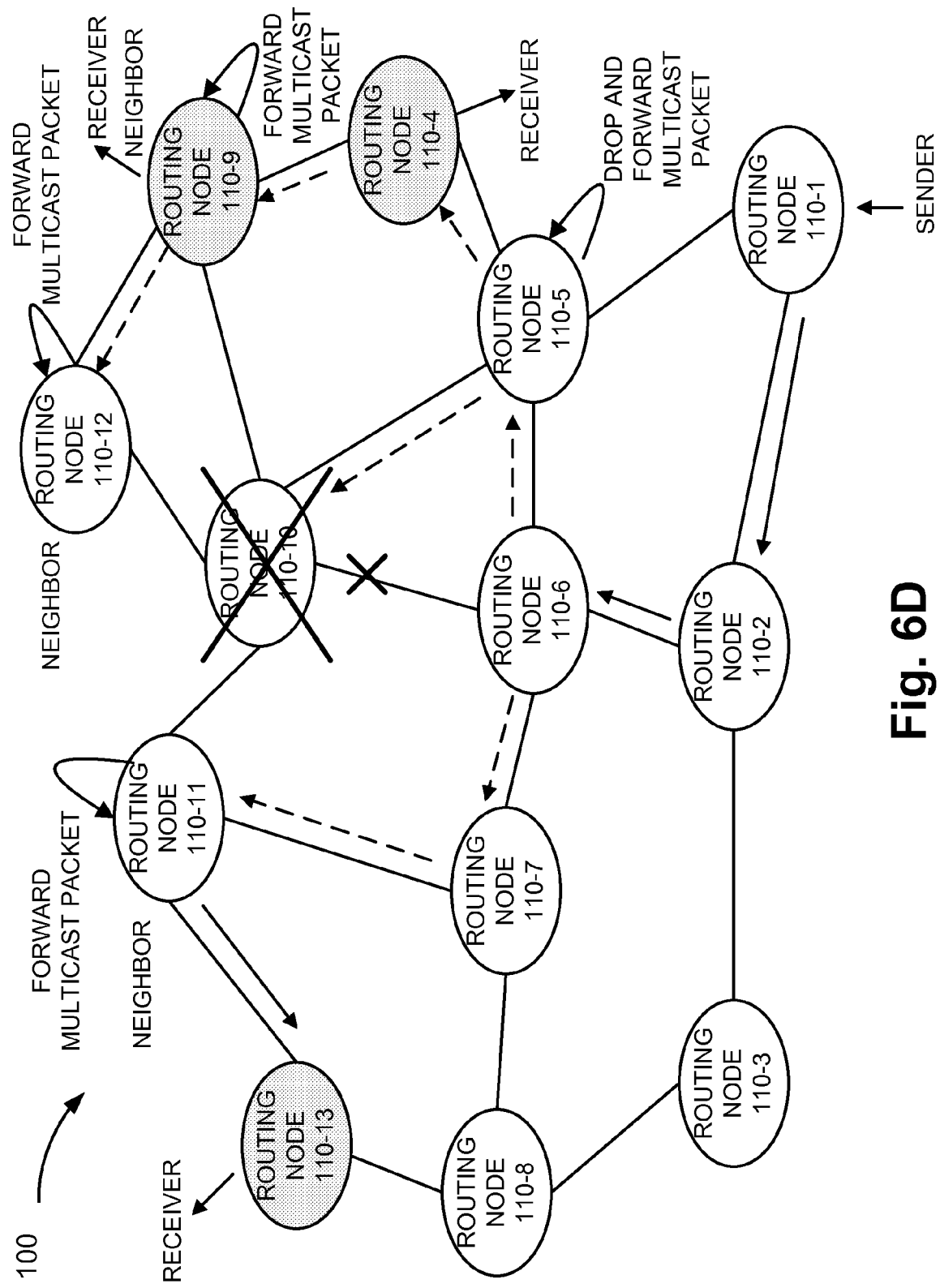

As illustrated in FIG. 6A, it may be assumed that a link failure and a node failure exist. Referring to FIG. 6B, routing node 110-6 may perform unicast encapsulation of multicast packets to generate unicast-encapsulated multicast packets. Routing node 110-6 may send the unicast-encapsulated multicast packets to routing node 110-10 via routing node 110-5. Additionally, routing node 110-6 may perform unicast encapsulation to the multicast packets to generate unicast-encapsulated multicast packets and send the unicast-encapsulated multicast packets to neighboring routing nodes 110-5, 110-9, 110-11, and 110-12, as illustrated in FIG. 6C. Referring to FIG. 6D, routing nodes 110-5, 110-9, 110-11, and 110-12 may perform operations similarly to those previously described. For example, routing nodes 110-9, 110-11, and 110-12 may perform unicast decapsulation to the unicast-encapsulated multicast packets and appropriately forward the multicast packets. In this example, routing node 110-5 may drop the unicast-encapsulated multicast packets having a destination to routing 110-10 when it knows that routing node 110-10 has failed. However, routing node 110-5 may decapsulate the unicast-encapsulated multicast packets having a destination to routing node 110-5 (i.e., the neighbor unicast-encapsulated packets) and send the decapsulated multicast packets (i.e., the multicast packets) to routing node 110-4. Routing node 110-5 may send the unicast-encapsulated multicast packets having unicast destinations of routing node 110-9 and 110-12 to routing node 110-4.

Figure 7A:
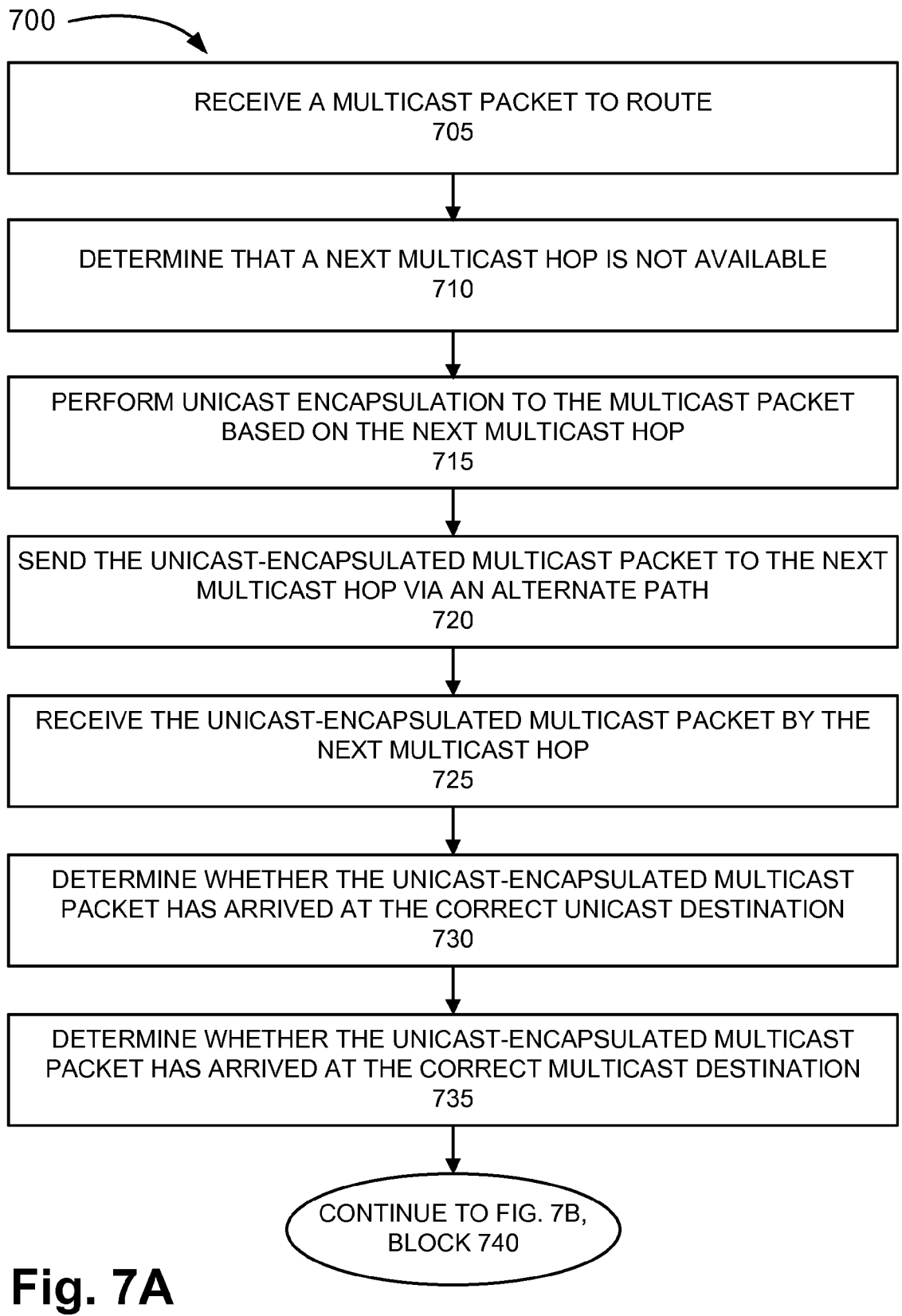
FIGS. 7A and 7B are flowcharts illustrating an exemplary process for providing multicast fast rerouting when a link failure occurs.
Figure 7B:
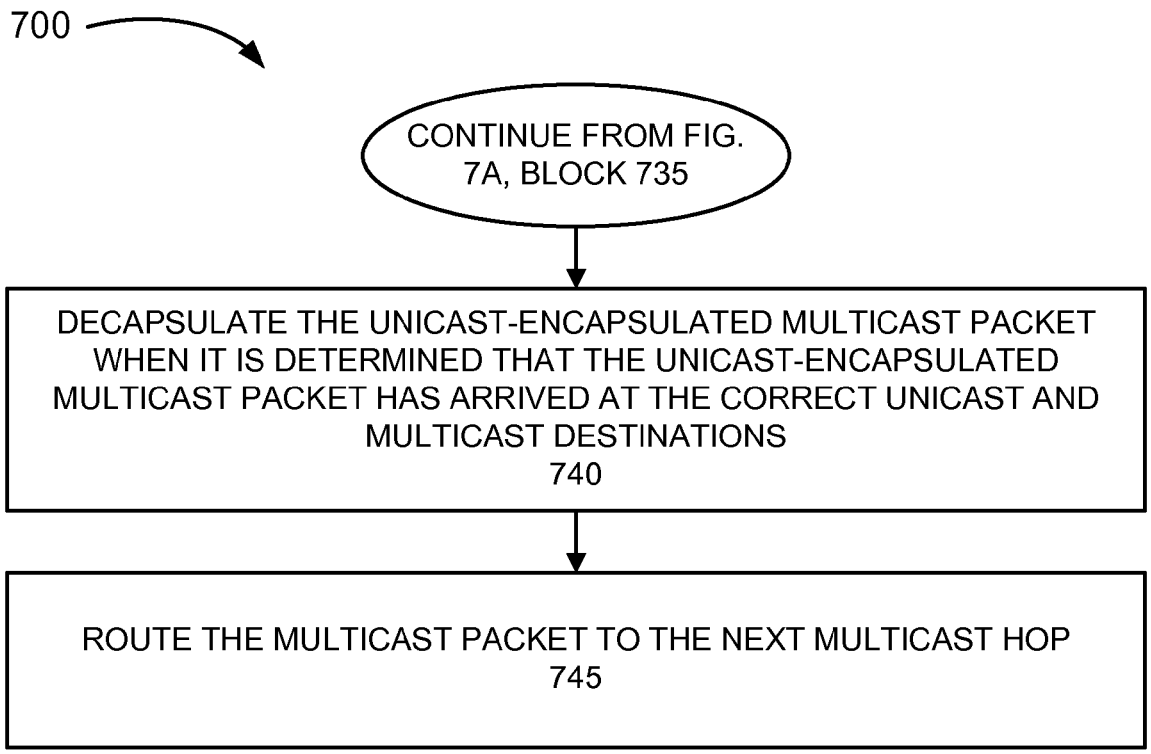

FIGS. 7A and 7B are flowcharts illustrating an exemplary process 700 for providing multicast fast rerouting when a link failure occurs. According to an exemplary embodiment, process 700 may be performed by routing node 110 when a link failure occurs, as previously described.

Process 700 may include receiving a multicast packet to route (block 705). For example, as previously described, routing node 110 may receive a multicast packet from another routing node 110.

It may be determined that a next multicast hop is not available (block 710). For example, as previously described, routing node 110 may determine that a next multicast hop is not available. By way of example, routing node 110 may determine that a link failure exists between routing node 110 and a next hop routing node 110, that the transmission of the multicast packet to the next hop routing node 110 is not successful, or that the next hop routing node 110 did not successfully receive the multicast packet. Routing node 110 may use network state information (e.g., link state information (e.g., obtained from other routing nodes 110, associated with a protocol, etc.), etc.) to determine that a link failure exists and/or that a multicast path to the next multicast hop cannot be used.

Unicast encapsulation of the multicast packet may be performed based on the next multicast hop (block 715). For example, as previously described, routing node 110 may perform unicast encapsulation with respect to the multicast packet. The unicast encapsulation may include unicast information at least including a unicast address of the next hop routing node 110. The unicast information may encapsulate the multicast packet in the form of a header and/or trailer.

The unicast-encapsulated multicast packet may be sent to the next multicast hop via an alternate path (block 720). For example, as previously described, routing node 110 may send the unicast-encapsulated multicast packet to the next hop routing node 110 via an alternate path (e.g., a unicast path).

The unicast-encapsulated multicast packet may be received by the next multicast hop (block 725). For example, as previously described, the next hop routing node 110 may receive the unicast-encapsulated multicast packet.

It may be determined whether the unicast-encapsulated multicast packet has arrived at the correct unicast destination (block 730). For example, as previously described, the next hop routing node 110 may inspect the unicast information and determine whether it arrived at the correct unicast destination by comparing its own address with the destination address included in the unicast information. The next hop routing node 110 may determine that a match exists based on the comparison.

It may be determined whether the unicast-encapsulsated multicast packet has arrived at the correct multicast destination (block 735). For example, as previously described, the next hop routing node 110 may inspect the multicast packet to determine whether the next hop routing node 110 is a part of the multicast group. By way of example, the next hop routing node 110 may compare its own address with a multicast group address. The next hop routing node 110 may determine that a match exists based on the comparison.

Referring to FIG. 7B, the unicast-encapsulated multicast packet may be unicast-decapsulated when it is determined that the unicast-encapsulated multicast packet has arrived at the correct unicast and multicast destinations (block 740). For example, the next hop routing node 110 may decapsulate the unicast-encapsulated multicast packet when the next hop routing node 110 determines that the unicast-encapsulated multicast packet has arrived at the correct unicast and multicast destination.

The multicast packet may be routed to the next multicast hop (block 745). For example, as previously described, the next hop routing node 110 may route the multicast packet toward the next multicast hop.

Although FIGS. 7A and 7B illustrate an exemplary process 700 for providing multicast fast rerouting, according to other implementations, process 700 may include additional operations, fewer operations, and/or different operations than those illustrated in FIGS. 7A and 7B and described herein. For example, as previously described, according to other embodiments, a routing node 110 may insert unicast information in an available field of the multicast packet. Additionally, a routing node 110 may remove the unicast information from the multicast packet.

Figure 8A:
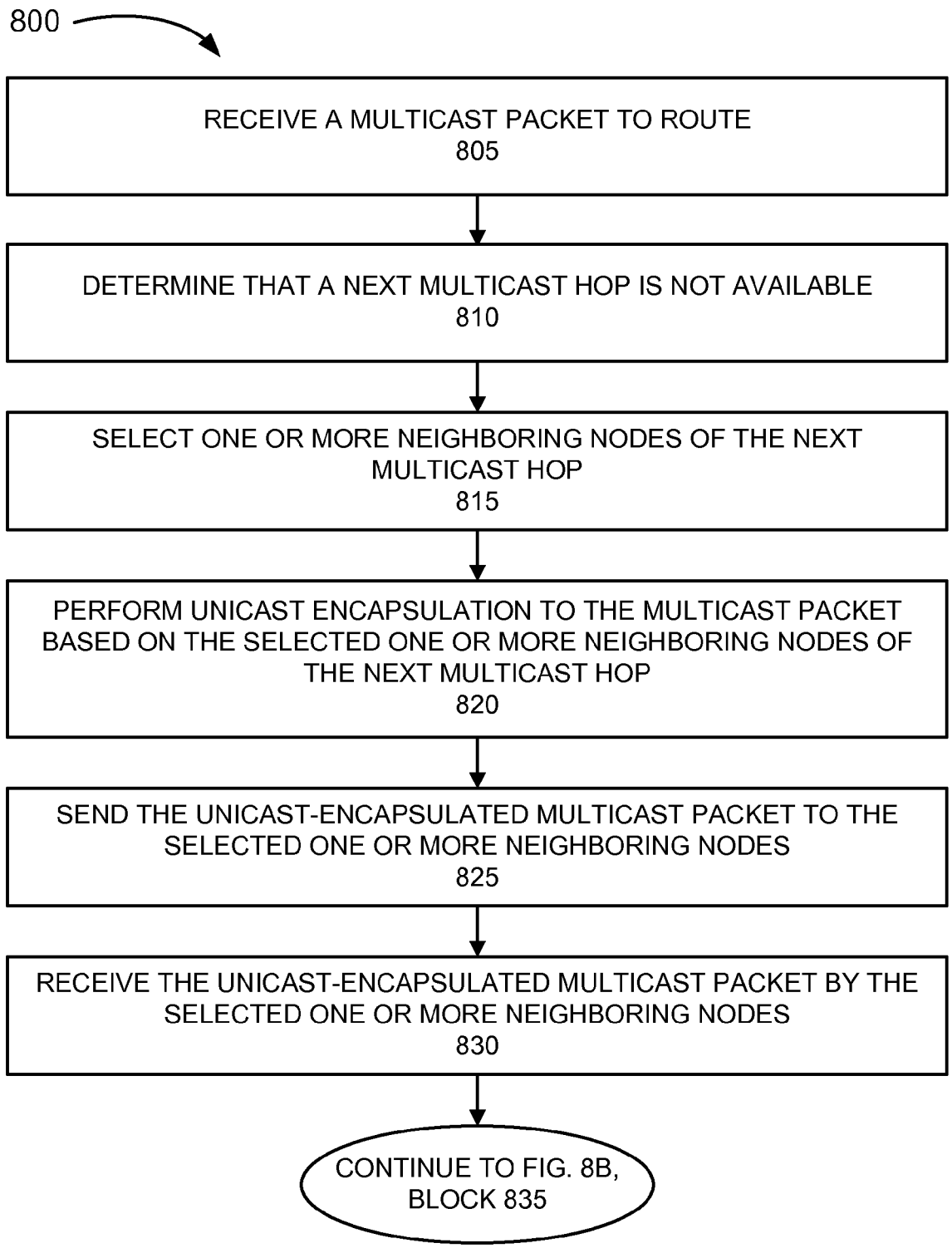
FIGS. 8A and 8B are flowcharts illustrating an exemplary process for providing multicast fast rerouting when a node failure occurs.
Figure 8B:
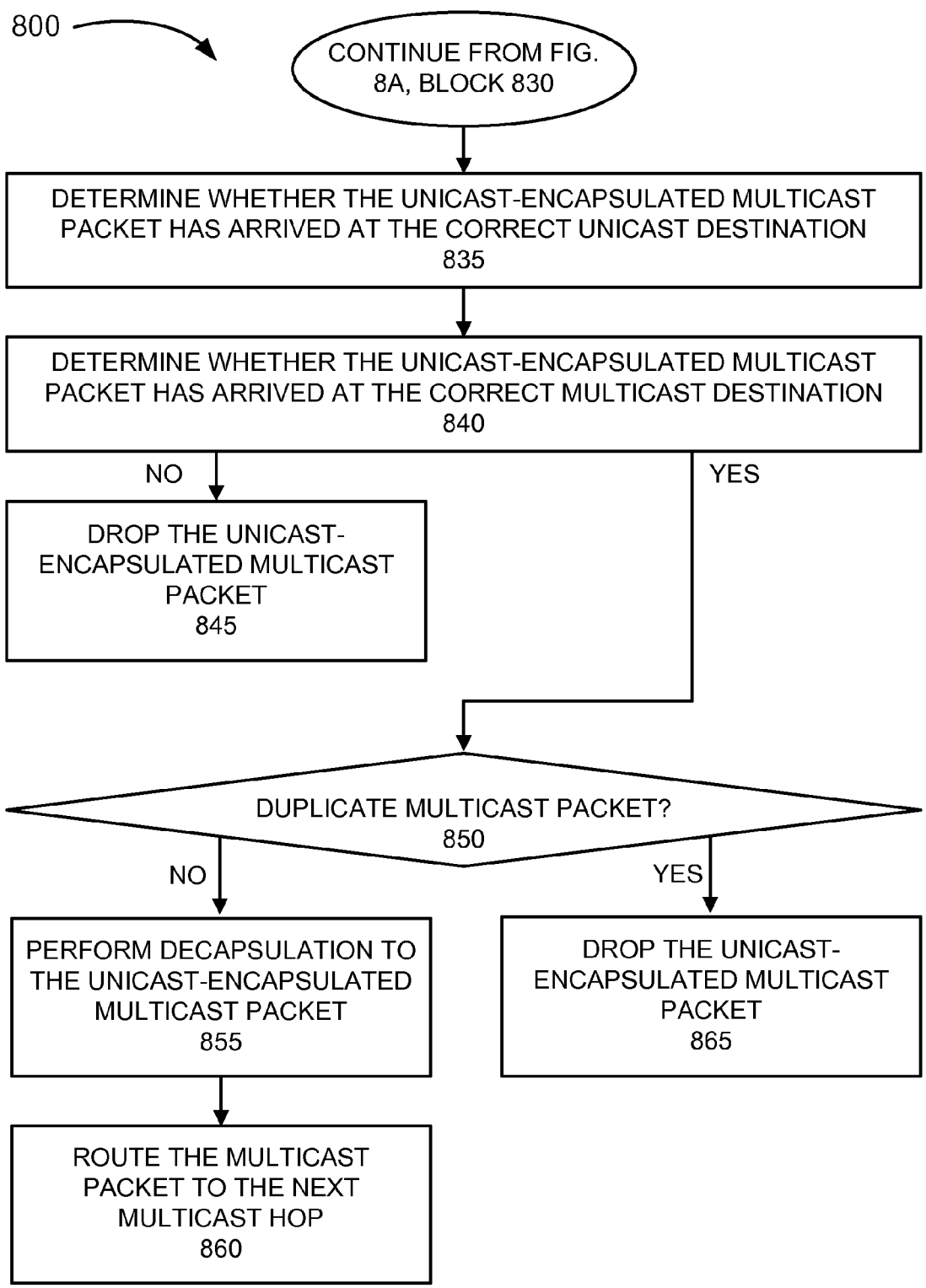

FIGS. 8A and 8B are flowcharts illustrating an exemplary process 800 for providing multicast fast rerouting when a node failure occurs.

Process 800 may include receiving a multicast packet to route (block 805). For example, as previously described, routing node 110 may receive a multicast packet from another routing node 110.

It may be determined that a next multicast hop is not available (block 810). For example, as previously described, routing node 110 may determine that a next multicast hop is not available. By way of example, routing node may determine that a node failure exists with respect to a next hop routing node 110, that the transmission of the multicast packet to the next hop routing node 110 is not successful, or that the next hop routing node 110 did not successfully receive the multicast packet. Routing node 110 may also use network state information (e.g., node failure information (e.g., obtained from other routing nodes 110, associated with a protocol, etc.), etc.) to determine that a failure exists and/or that a multicast path to the next multicast hop cannot be used.

One or more neighboring nodes of the next multicast hop may be selected (block 815). For example, as previously described, routing node 110 may select one or more neighboring nodes of the next hop routing node 110. According to one embodiment, routing node 110 may select all neighboring nodes of the next hop routing node 110. According to an exemplary embodiment, routing node 110 may not consider itself as a neighboring node.

Unicast encapsulation to the multicast packet may be performed based on the selected one or more neighboring nodes of the next multicast hop (block 820). For example, as previously described, routing node 110 may perform unicast encapsulation with respect to the multicast packet. The unicast encapsulation may include unicast information at least including a unicast address of the selected one or more neighboring routing node(s) 110. The unicast information may encapsulate the multicast packet in the form of a header and/or trailer.

The unicast-encapsulated multicast packet may be sent to the selected one or more neighboring nodes (block 825). For example, as previously described, routing node 110 may send the unicast-encapsulated multicast packet to the selected one or more neighboring routing node(s) 110.

The unicast-encapsulated multicast packet may be received by the one or more neighboring routing nodes (block 830). For example, as previously described, the selected one or more neighboring nodes 110 may each receive the unicast-encapsulated multicast packet.

Referring to FIG. 8B, it may be determined whether the unicast-encapsulated multicast packet has arrived at the correct unicast destination (block 835). For example, as previously described, the neighbor routing node 110 may inspect the unicast information and determine whether it arrived at the correct unicast destination by comparing its own address with the destination address included in the unicast information. The neighbor routing node 110 may determine that a match exists based on the comparison.

It may be determined whether the unicast-encapsulated multicast packet has arrived at the correct multicast destination (block 840). For example, as previously described, the neighbor routing node 110 may inspect the multicast packet to determine whether the neighbor routing node 110 is a part of the multicast group. By way of example, the neighbor routing node 110 may compare its own address with a multicast group address. The neighbor routing node 110 may determine whether a match exists based on the comparison.

If it is determined that a match does not exist (block 840-NO), the neighbor routing node 110 may drop the unicast-encapsulated multicast packet. If it is determined that a match does exist (block 840-YES), the neighbor routing node 110 may determine whether the multicast packet is a duplicate (block 850). For example, the neighbor routing node 110 may determine whether a multicast packet is a duplicate based on a sequence number or some other conventional technique.

If it is determined that the multicast packet is not a duplicate (block 850-NO), the neighbor routing node 110 may perform decapsulation to the unicast-encapsulated multicast packet (block 855), and route the multicast packet to the next multicast hop (block 860). For example, as previously described, the neighbor routing node 110 may perform decapsulation and route the multicast packet to its next multicast destination.

If it is determined that the multicast packet is a duplicate (block 850-YES), the neighbor routing node 110 may drop the unicast-encapsulated multicast packet (block 865). For example, as previously described, the neighbor routing node 110 may discard the unicast-encapsulated multicast packet.

Although FIGS. 8A and 8B illustrate an exemplary process 800 for providing multicast fast rerouting, according to other implementations, process 800 may include additional operations, fewer operations, and/or different operations than those illustrated in FIGS. 8A and 8B and described herein. For example, as previously described, according to other embodiments, a routing node 110 may insert unicast information in an available field of the multicast packet. Additionally, a neighbor routing node 110 may remove the unicast information from the multicast packet. Additionally, as previously described, according to an exemplary embodiment, routing node 110 may send a unicast-encapsulated multicast packet to both the next multicast hop and one or more of its neighboring nodes.

The foregoing description of implementations provides illustration, but is not intended to be exhaustive or to limit the implementations to the precise form disclosed. Accordingly, modifications to the implementations described herein may be possible. For example, The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks are described with regard to the processes illustrated in FIGS. 7A, 7B, 8A, and 8B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. By way of example, one or more exemplary embodiments may be implemented in conjunction with alternate or backup multicast paths. For example, a routing node may determine to use one or more of the unicast approaches described herein when alternate or backup multicast path(s) fail. Alternatively, routing node may include logic to decide a best choice between using a unicast approach or an alternate or backup multicast path based on current network state information. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
   receiving, by a processor included in a first node, a multicast packet to route to a second node that is a next multicast hop along a multicast path;
   determining, by the processor, that the second node is not available;
   selecting, by the processor and based on determining that the second node is not available, third nodes, wherein selecting the third nodes includes:
   identifying adjacent neighbor nodes that are neighbor hops of the second node,
   determining a particular node, of the adjacent neighbor nodes, that received the multicast packet prior to the multicast packet being received by the first node, and
   selecting the third nodes from the adjacent neighbor nodes,
   the particular node being excluded from the third nodes;
   performing, by the processor, unicast encapsulation to the multicast packet to generate a unicast-encapsulated multicast packet,
   the unicast-encapsulated multicast packet including unicast information that identifies respective addresses of the third nodes; and
   sending, by the processor and based on the unicast information, the unicast-encapsulated multicast packet to the third nodes as one or more unicast transmissions via one or more unicast transmission paths that differ from the multicast path.

2. The method of claim 1, wherein a node:
   receives the unicast-encapsulated multicast packet,
   determines, based on comparing an address, associated with the node, to the respective addresses identified in the unicast information, whether the node is a unicast hop for the unicast-encapsulated multicast packet,
   decapsulates the unicast-encapsulated multicast packet, based on determining that the node is a unicast hop, to recover the multicast packet,
   determines whether the node is a multicast hop for the multicast packet based on contents of the multicast packet, and
   deletes the multicast packet when the node is not a multicast hop for the multicast packet.

3. The method of claim 2, wherein, based on determining that the node is a multicast hop for the multicast packet, the node routes the multicast packet to a next multicast hop for the multicast packet.

4. The method of claim 1, wherein the third nodes correspond to all of the adjacent routing nodes, relative to the second node, excluding the particular node, and
   wherein at least one third node, of the third nodes, is not included in a multicast group associated with the received multicast packet.

5. A routing node comprising:
   a memory; and
   a processor configured to:
   store, in the memory, information associated with a multicast packet;
   determine that a next multicast hop is not available via a multicast path;
   select neighbor hops of the next multicast hop based on determining that the next multicast hop is not available, wherein the processor, when selecting the neighbor hops, is further configured to:
   identify adjacent neighbor nodes of the next multicast hop, determine a particular node, of the adjacent neighbor nodes, that received the multicast packet prior to the multicast packet being received by the processor, and select the neighbor hops from the adjacent neighbor nodes, the particular node being excluded from the neighbor hops;

perform unicast encapsulation to the multicast packet to generate a unicast-encapsulated multicast packet, the unicast-encapsulated multicast packet including unicast information identifying respective addresses of the neighbor hops; and send the unicast-encapsulated multicast packet to each of the neighbor hops via a unicast transmission path.

6. The routing node of claim 5, wherein, when performing the unicast encapsulation, the processor is further configured to:

insert a network address of the routing node in at least one of:

a unicast header associated with the unicast-encapsulated multicast packet, or a unicast trailer associated with the unicast-encapsulated multicast packet.

7. The routing node of claim 5, wherein the processor is further configured to:

receive another unicast-encapsulated multicast packet;

determine whether a decapsulated multicast packet, extracted from the other unicast-encapsulated multicast packet, is a duplicate of the multicast packet; and drop the decapsulated multicast packet when the decapsulated multicast packet is a duplicate of the multicast packet.

8. The routing node of claim 5, wherein when selecting the neighbor hops, the processor is further configured to:

use unicast network topology information to select the unicast transmission path associated with each of the neighbor hops.

9. The routing node of claim 5, wherein the processor is further configured to:

receive another unicast-encapsulated multicast packet, the other unicast-encapsulated multicast packet being associated with a unicast destination address;

decapsulate the other unicast-encapsulated multicast packet when the unicast destination address corresponds to a unicast address associated with the routing node;

inspect a multicast group address included in a decapsulated multicast packet to determine whether the routing node is part of a multicast group pertaining to the decapsulated multicast packet; and send the multicast packet toward a next multicast hop when the routing node is part of the multicast group.

10. A non-transitory computer-readable medium storing instructions, the instructions comprising:

one or more instructions that, when executed by a processor associated with a routing node, cause the processor to:

receive a multicast packet to route to a next multicast hop via a multicast path;

determine that next multicast hop is not available via the multicast path;

select neighbor hops of the next multicast hop based on determining that the next multicast hop is not available, at least one neighbor hop, of the neighbor hops, not being included in the multicast path, wherein the one or more instructions to select the neighbor hops include:

one or more instructions to:

determine possible adjacent neighbor hops of the next multicast hop;

determine a particular possible neighbor hop, of the possible adjacent neighbor hops, that previously received the multicast packet; and select the neighbor hops from the possible adjacent neighbor hops, the particular possible neighbor hop being excluded from the neighbor hops;

identify respective unicast addresses associated with the neighbor hops;

modify the multicast packet to include information of the respective unicast addresses to form a modified packet; and sending the modified packet to the neighbor hops.

11. The non-transitory computer-readable medium of claim 10, wherein the one or more instructions to determine that the next multicast hop is not available via the multicast path further include:

one or more instructions to:

determine at least one of:

a link failure associated with the multicast path, or a node failure associated with the next multicast hop.

12. The non-transitory computer-readable medium of claim 10, wherein the instructions further comprise:

one or more instructions to:

identify one or more prior multicast hops that previously received the multicast packet; and select a unicast transmission path for sending the modified multicast packet to the neighbor hops, the unicast transmission path excluding the one or more prior multicast hops.

13. The non-transitory computer-readable medium of claim 10, wherein the one or more instructions to modify the multicast packet further include:

one or more instructions to:

encapsulate the multicast packet with at least one of a unicast header or a unicast trailer, the at least one of the unicast header or the unicast trailer including the information associated with the respective unicast addresses associated with the neighbor hops.

14. The method of claim 1, wherein selecting the third nodes includes:

determining the third nodes, from a plurality of nodes included in a network associated with second node, based on at least one of:

a topology of the network, or link state information associated with the respective unicast transmission.

15. The method of claim 1, further comprising:

receiving a packet addressed to the second node; and discarding the packet based on determining that the second node is not available.

16. The non-transitory computer-readable medium of claim 10, wherein the one or more instructions to select the neighbor hops include:

one or more instructions to:

determine at least one unicast transmission path for transmitting the modified multicast packet; and select the neighbor hops based on link state information associated with the at least one unicast transmission path.

17. The non-transitory computer-readable medium of claim 10, wherein sending the modified packet includes sending the modified packet via at least one unicast transmission path that differs from the multicast path.

18. The non-transitory computer-readable medium of claim 10, wherein the one or more instructions to select the neighbor hops further include:
one or more instructions to:
determine a topology of a network associated with the next multicast hop; and
select the neighbor hops further based on the topology of the network.

\* \* \* \* \*